(12) United States Patent
Davis et al.

(10) Patent No.: US 7,747,505 B1
(45) Date of Patent: Jun. 29, 2010

(54) APPARATUS AND PROCESS FOR VERIFYING HONEST GAMING TRANSACTIONS OVER A COMMUNICATIONS NETWORK

(75) Inventors: Steven Benjamin Davis, Washington, DC (US); Cheryl Susan Campbell, Washington, DC (US)

(73) Assignee: Quixotic Solutions Inc.

( * ) Notice: Subject to any disclaimer, the term of this patent is extended or adjusted under 35 U.S.C. 154(b) by 2664 days.

(21) Appl. No.: 09/690,990

(22) Filed: Oct. 18, 2000

Related U.S. Application Data

(63) Continuation of application No. 09/477,451, filed on Jan. 4, 2000, now Pat. No. 6,165,072, which is a continuation of application No. 08/921,520, filed on Sep. 2, 1997, now Pat. No. 6,030,288.

(51) Int. Cl.
*G06Q 40/00* (2006.01)
(52) U.S. Cl. .......................................... 705/37; 705/38
(58) Field of Classification Search .................... 705/39, 705/44, 37–38; 463/18, 25, 29
See application file for complete search history.

(56) References Cited

U.S. PATENT DOCUMENTS

| | | | | |
|---|---|---|---|---|
| 4,302,810 A | | 11/1981 | Bouricius et al. ............ | 364/200 |
| 4,326,098 A | | 4/1982 | Bouricius et al. ........ | 178/22.08 |
| 4,630,201 A | | 12/1986 | White ......................... | 364/408 |
| 4,906,826 A | | 3/1990 | Spencer ...................... | 235/379 |
| 5,038,284 A | | 8/1991 | Kramer ....................... | 364/408 |
| 5,269,521 A | | 12/1993 | Rossides ..................... | 273/138 |
| 5,305,200 A | | 4/1994 | Hartheimer et al. ......... | 364/408 |
| 5,326,104 A | * | 7/1994 | Pease et al. .................... | 463/18 |
| 5,398,932 A | | 3/1995 | Eberhardt et al. ........... | 273/138 |
| 5,410,684 A | | 4/1995 | Ainsworth et al. .......... | 395/575 |
| 5,569,082 A | | 10/1996 | Kaye ............................ | 463/17 |
| 5,586,937 A | | 12/1996 | Menashe ...................... | 463/41 |
| 5,611,730 A | | 3/1997 | Weiss .......................... | 463/20 |
| 5,615,269 A | | 3/1997 | Micali ......................... | 380/49 |
| 5,629,982 A | | 5/1997 | Micali ......................... | 380/30 |
| 5,633,930 A | | 5/1997 | Davis et al. .................. | 380/24 |

(Continued)

FOREIGN PATENT DOCUMENTS

WO WO97/02073 1/1997

(Continued)

*Primary Examiner*—Thu Thao Havan
(74) *Attorney, Agent, or Firm*—Katten Muchin Rosenman LLP

(57) ABSTRACT

Apparatus and method for verifying honest gaming transactions over a communications network includes structure and process whereby a host processor receives a random number from a satellite processor over the communications network. The host processor generates a game seed based on the random number. The host processor also receives an arbitrary game input from the satellite processor and generates a game result based on the game input, the game seed, and predetermined game rules. The satellite processor provides the random number and the arbitrary game input to the host processor over the communications network, and receives data corresponding to the game seed and the game result from the host processor. The satellite processor verifies the honesty of the transaction by (i) generating a game result based on the game input, the data corresponding to the game seed, and the predetermined game rules, and (ii) compares the generated game result with the received game result. A storage medium is also provided for storing a computer-implemented program to carry out the functions described above.

13 Claims, 21 Drawing Sheets

U.S. PATENT DOCUMENTS 5,850,442 A * 12/1998 Muftic .................. 705/65
5,910,987 A * 6/1999 Ginter et al. ............ 705/52
5,970,143 A * 10/1999 Schneier et al. ......... 713/181
6,030,288 A    2/2000 Davis et al. ............. 463/29
6,134,536 A * 10/2000 Shepherd .............. 705/37

FOREIGN PATENT DOCUMENTS

WO    WO97/19537    5/1997

* cited by examiner

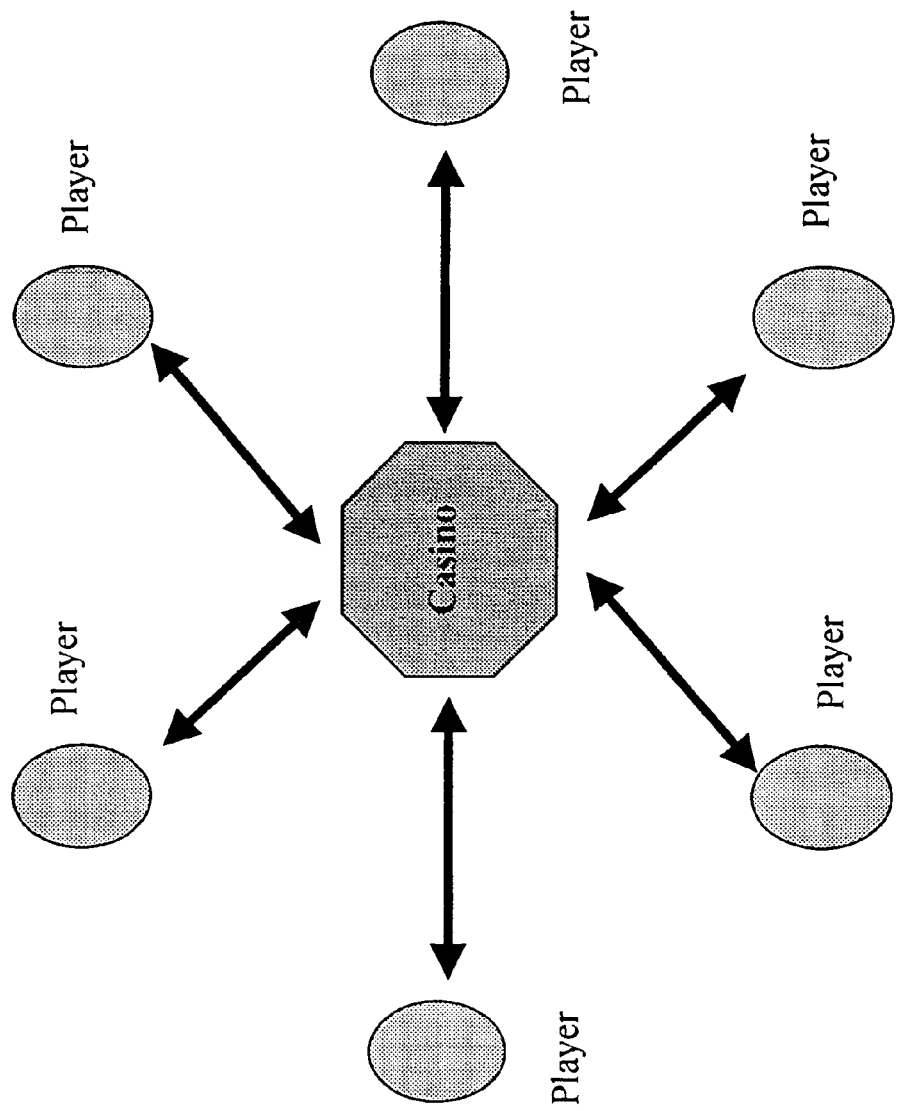
Figure 1: Player/Game Architecture

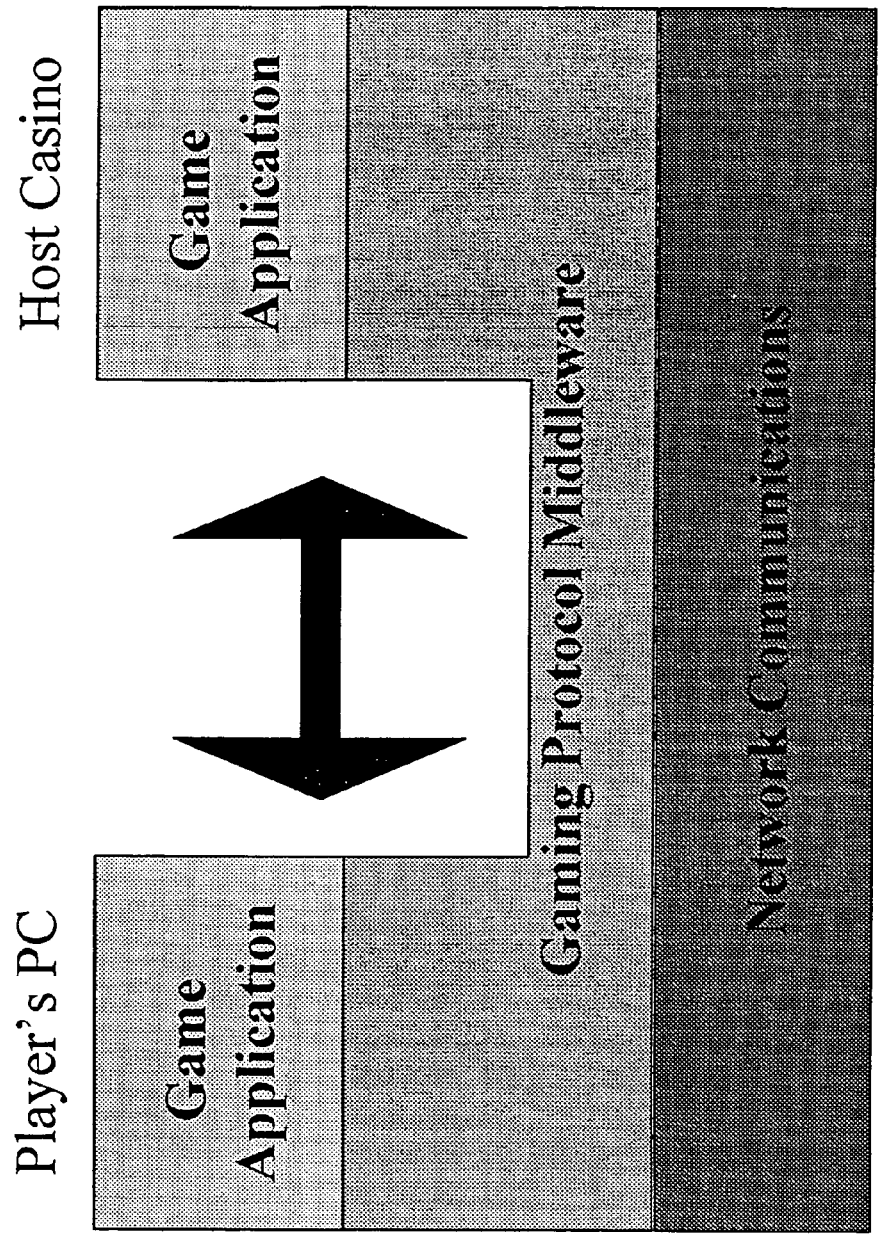
Figure 2: Player/Host Casino Middleware Architecture

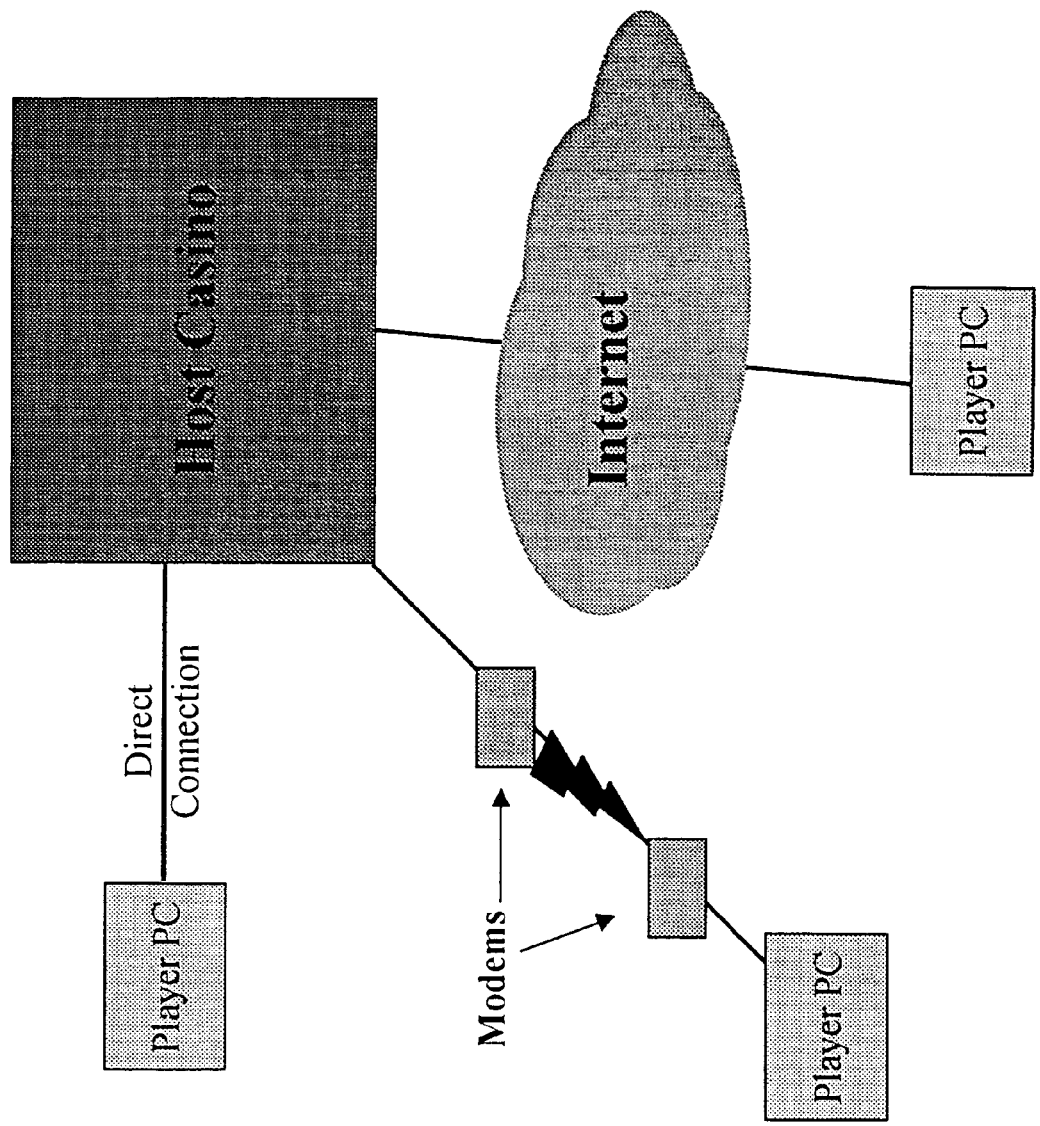
Figure 3: Generic Physical Architecture

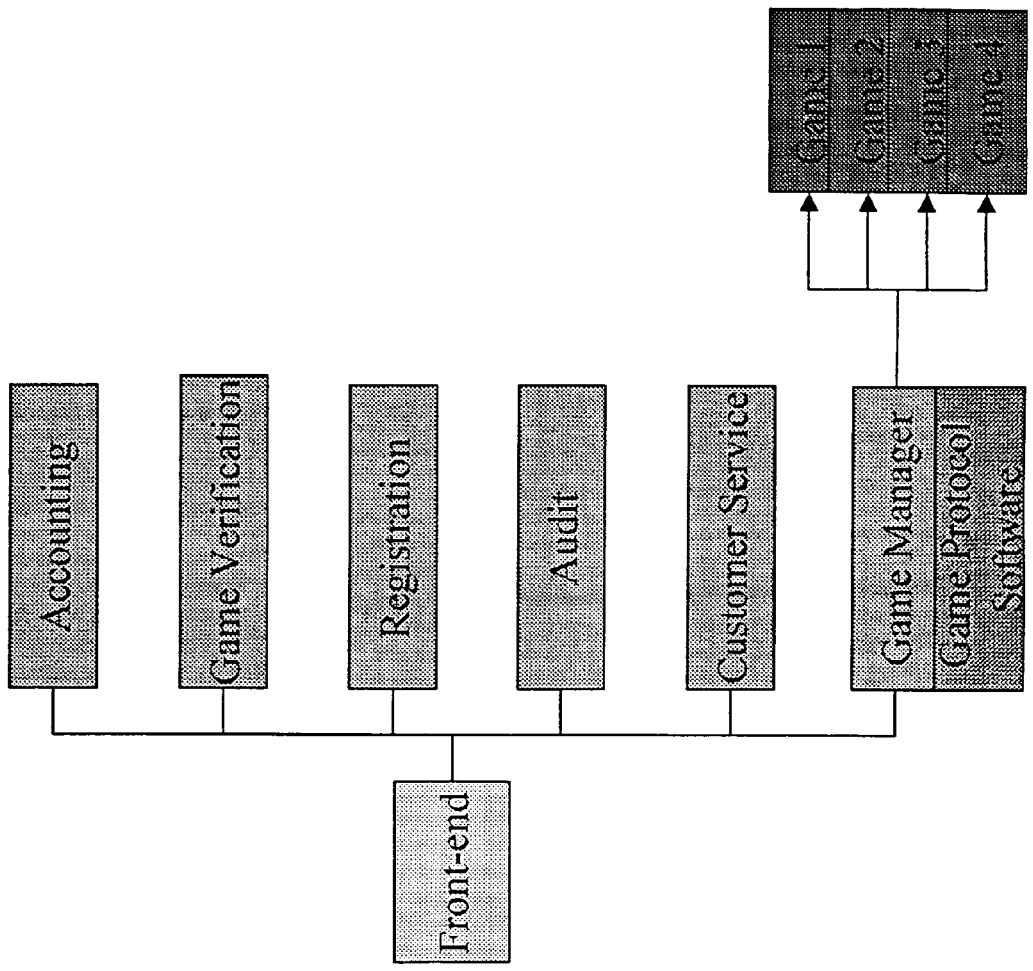
Figure 4: Host Casino Functional Architecture

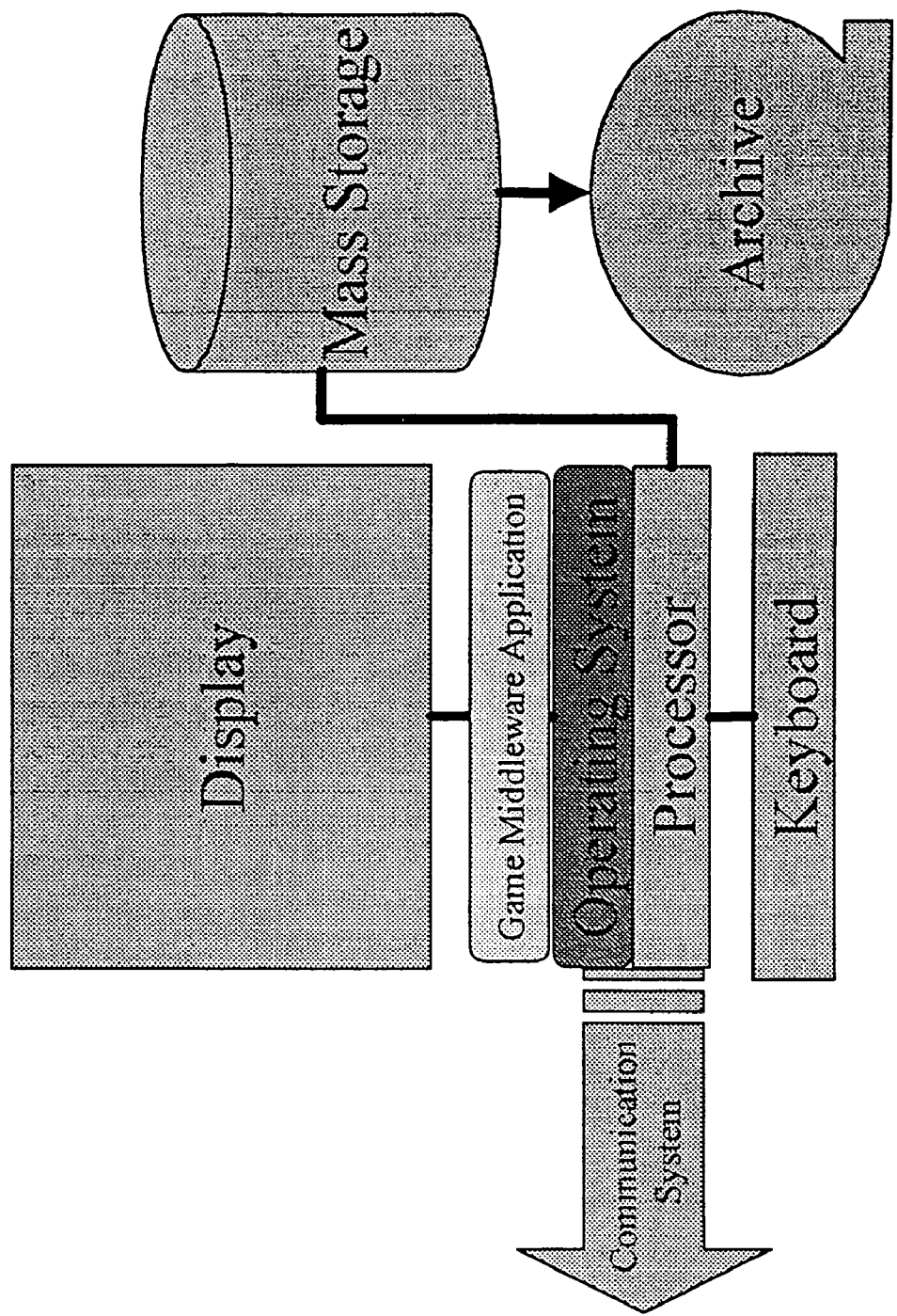
Figure 5: Host Casino Physical Architecture

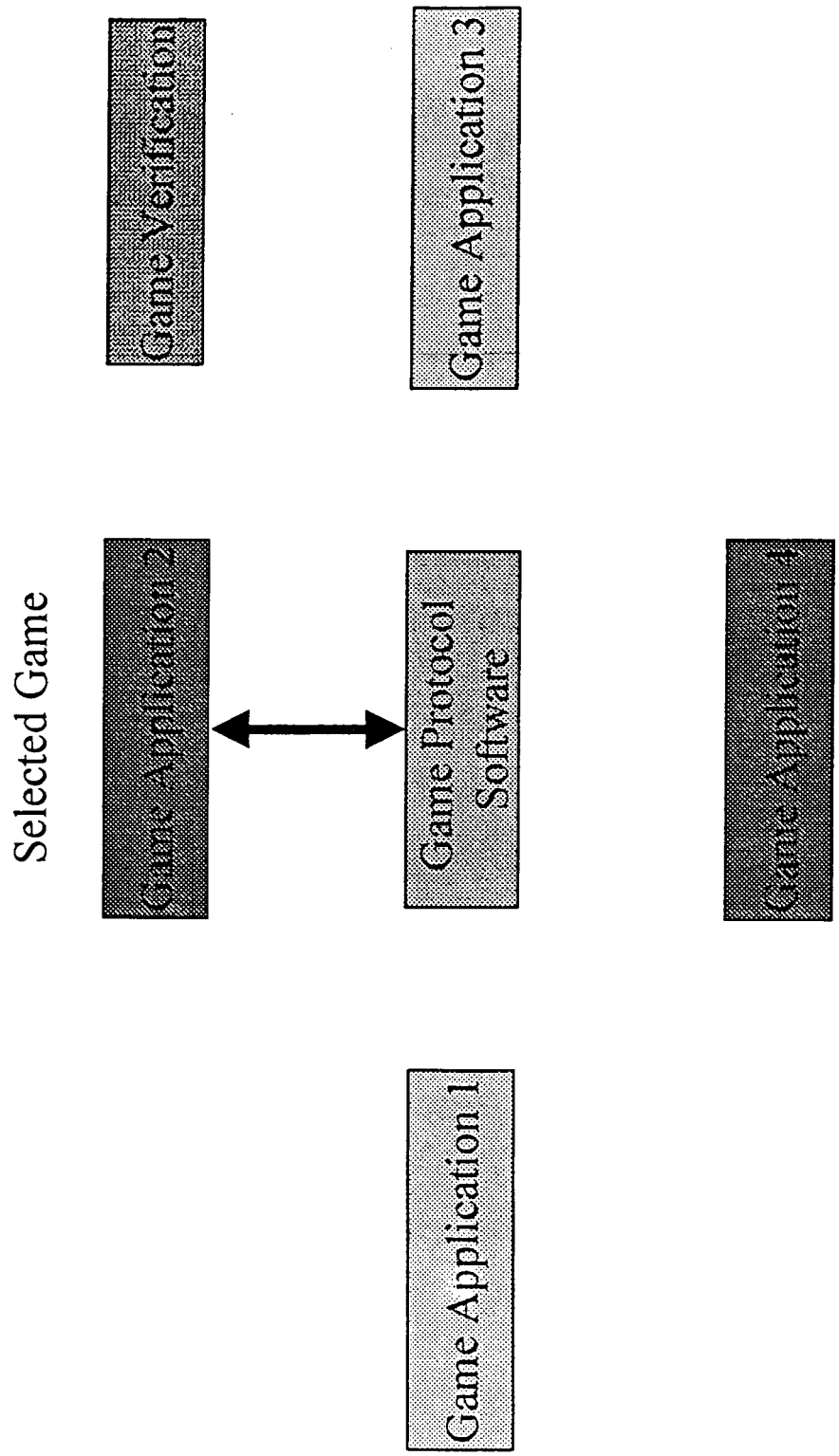
Figure 6: Player System Functional Architecture

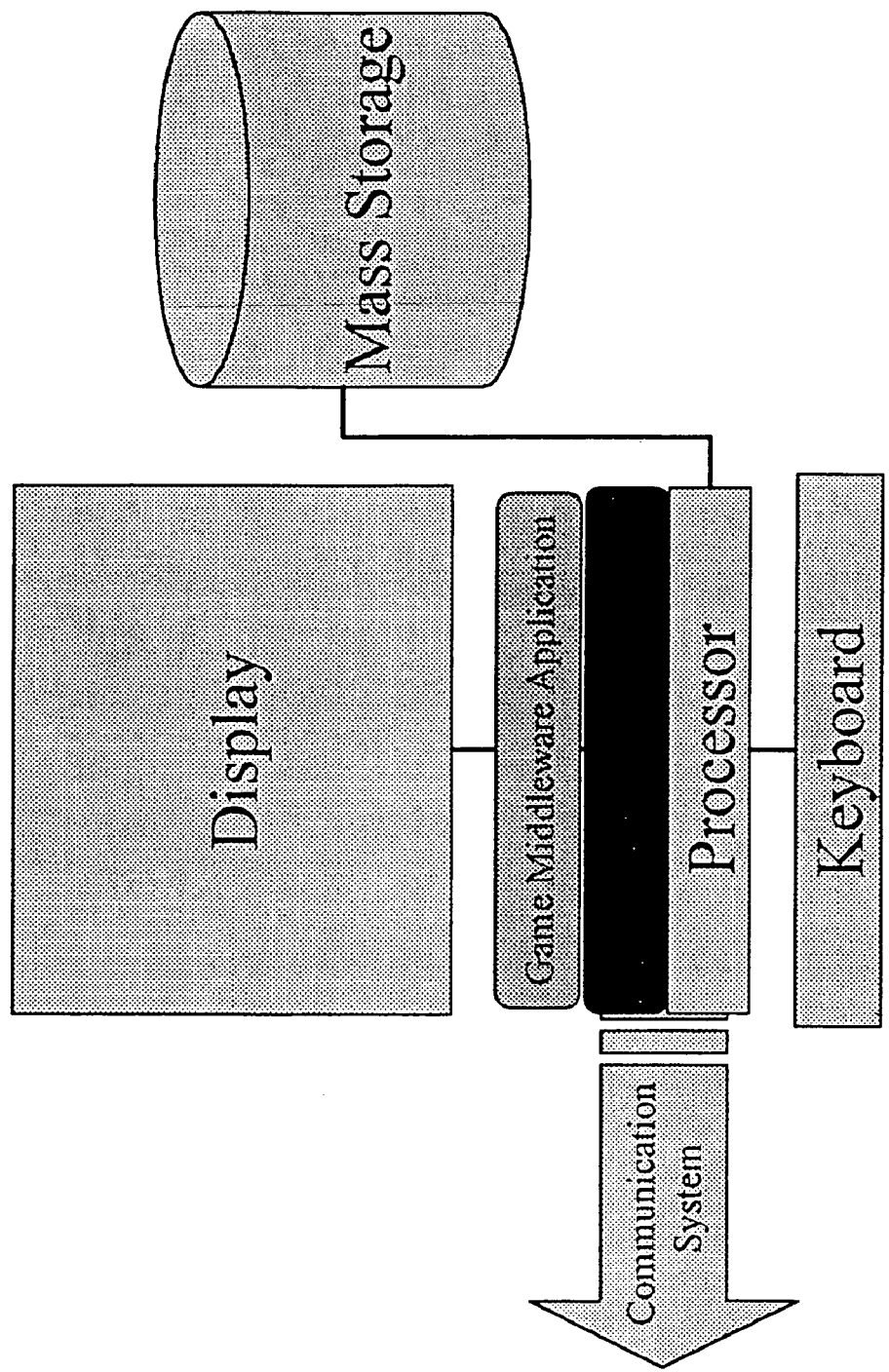
Figure 7: Player System Physical Architecture

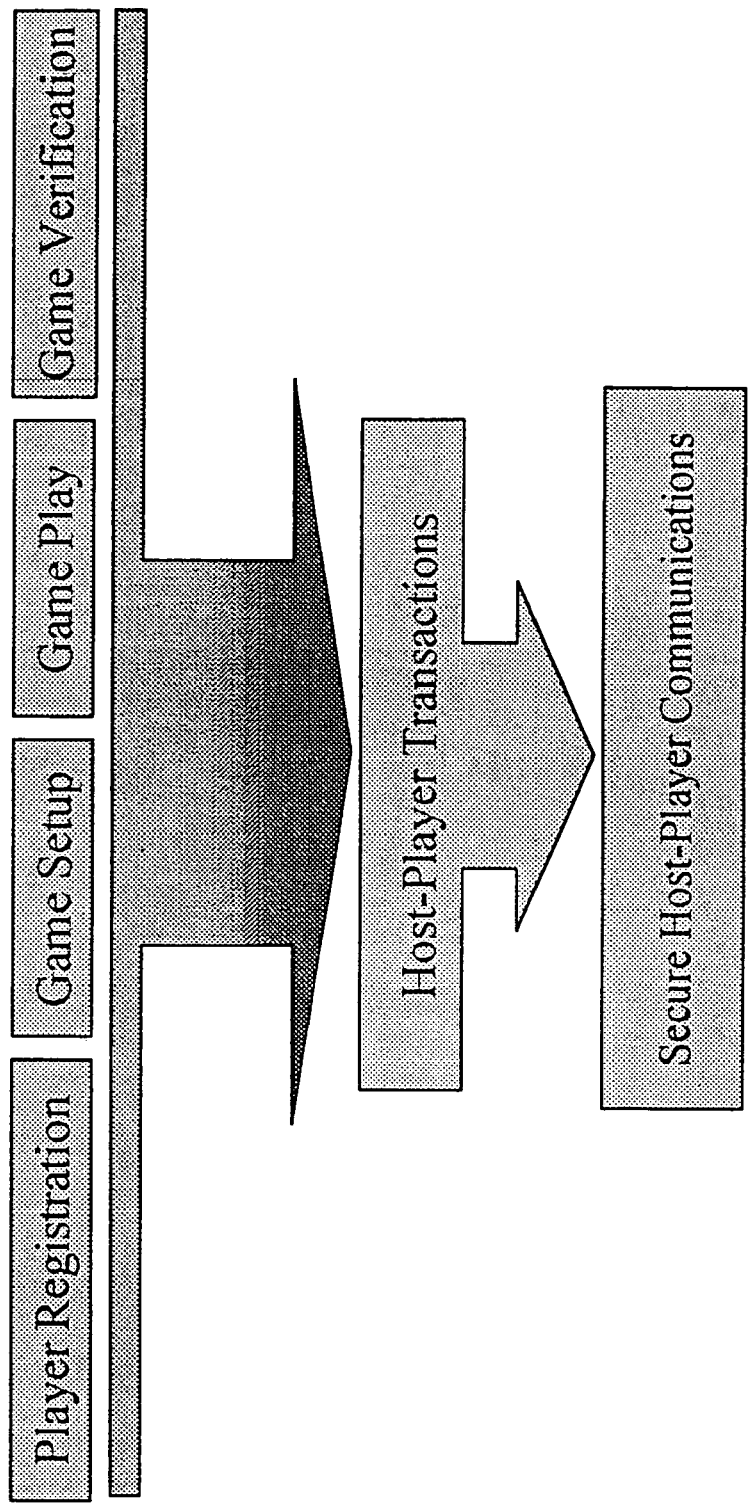
Figure 8: Top-Level Process Relationships

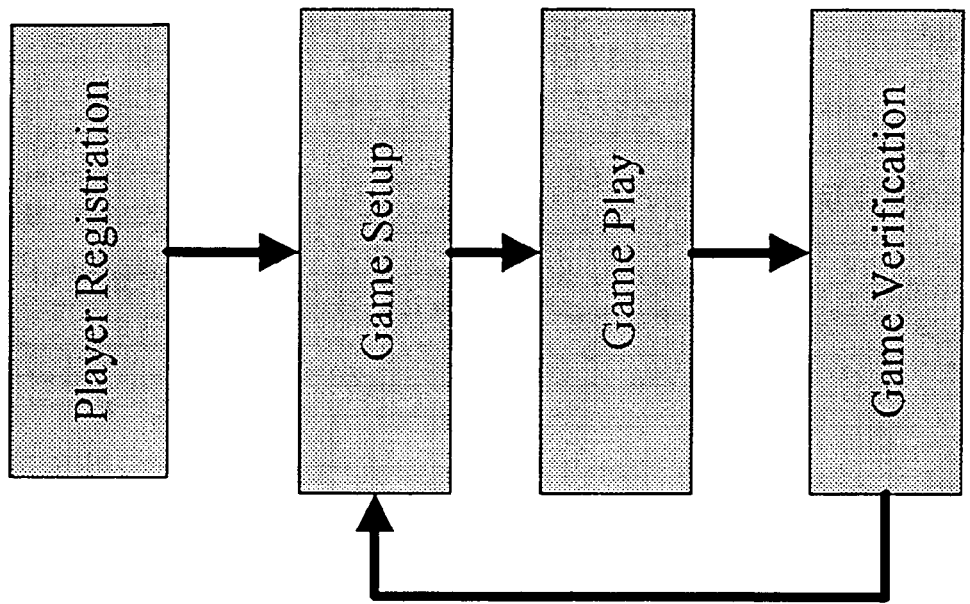
Figure 9: Top-Level Process Relationships

Figure 10: Key
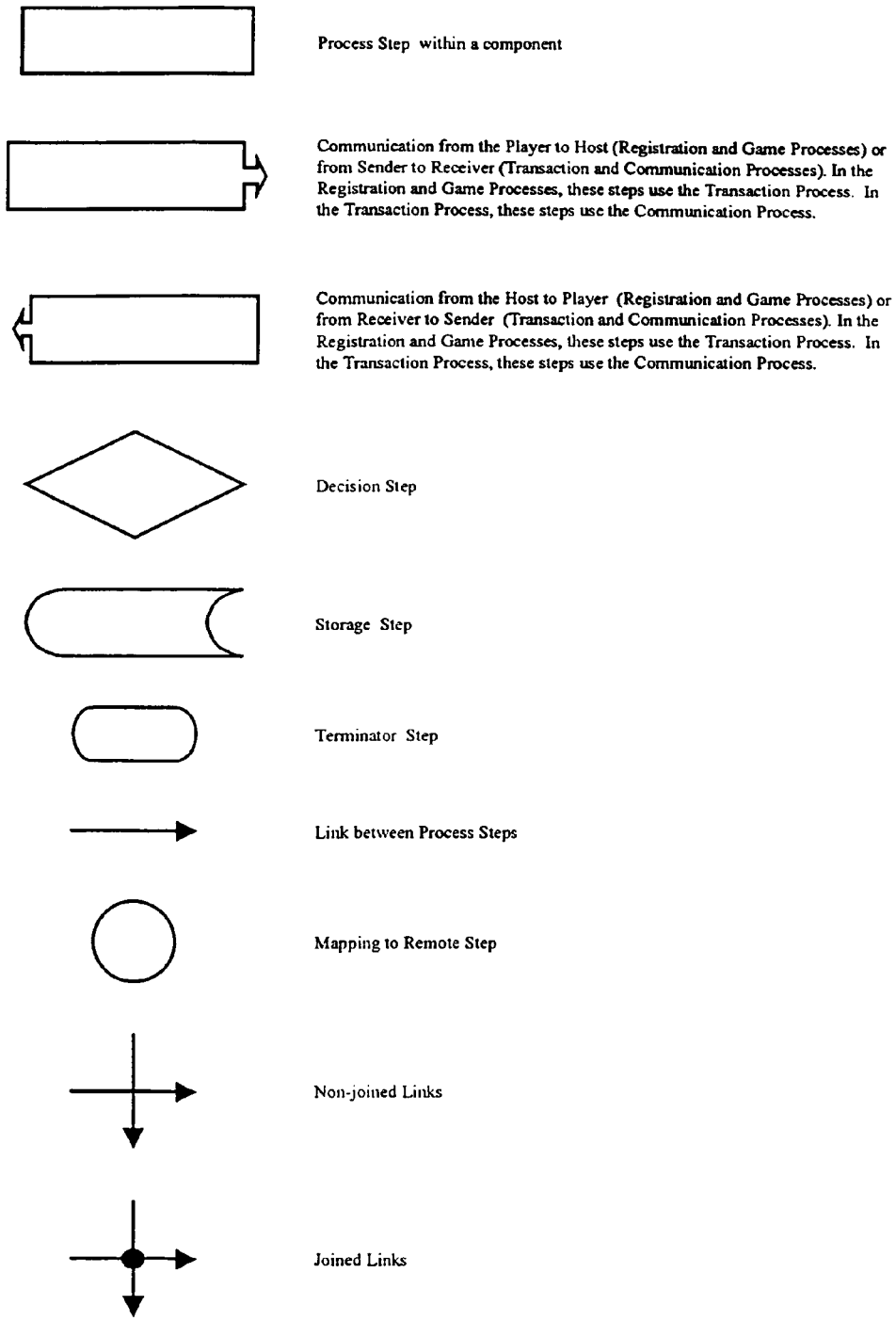

Figure 11: Player Registration Flow-Chart
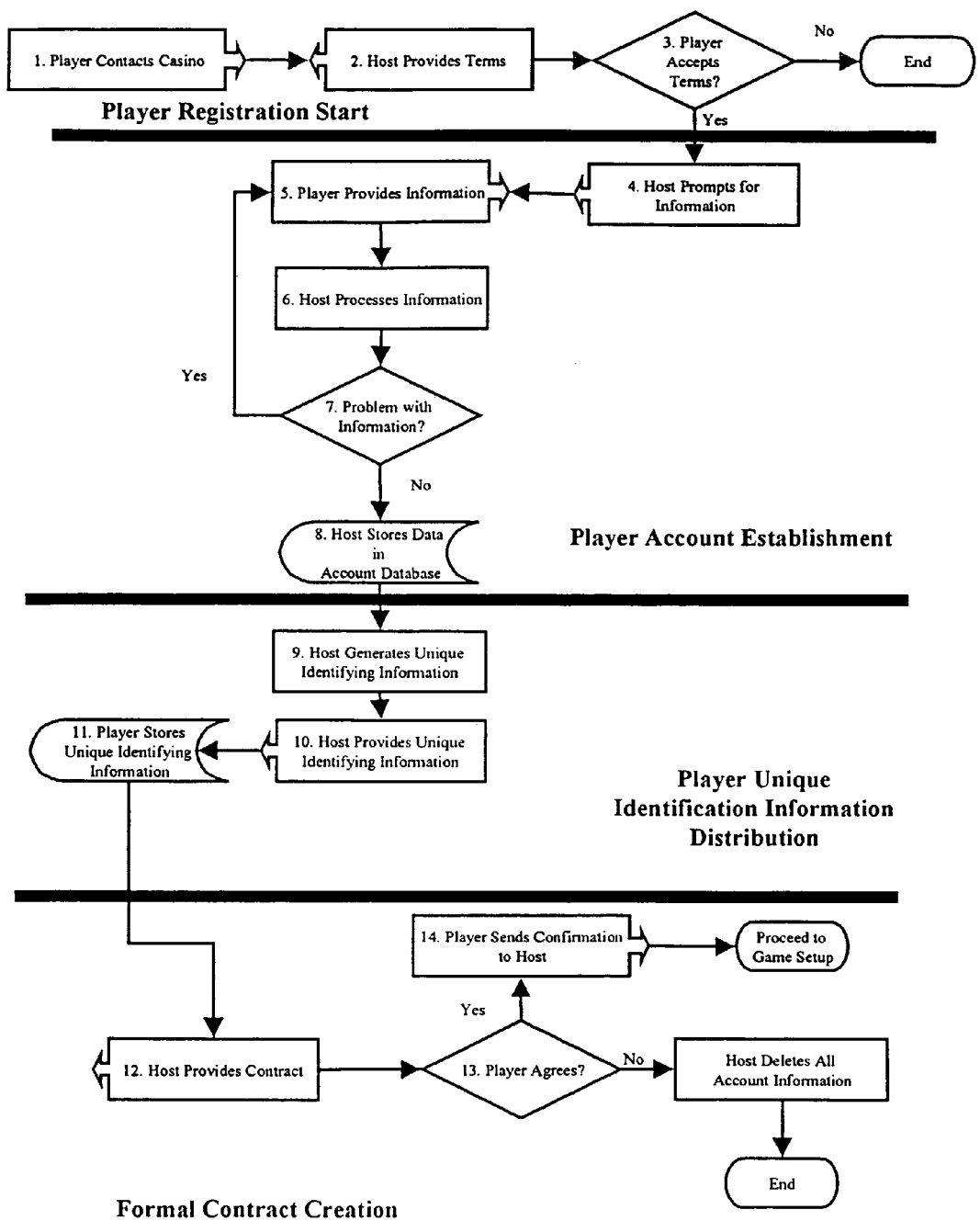

Figure 12: Game Setup Flow-Chart
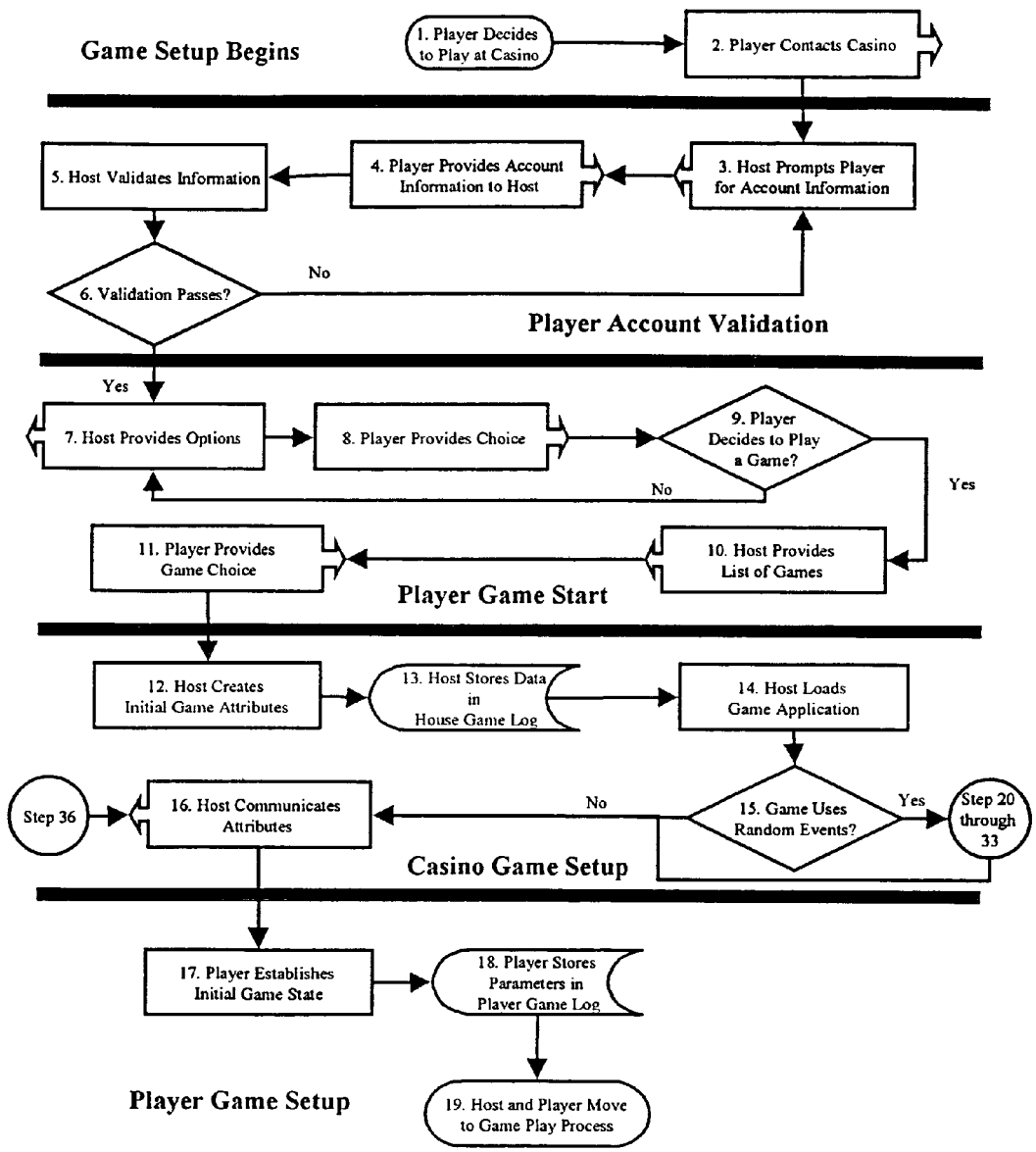

Figure 12: Game Setup Flow-Chart (cont'd)
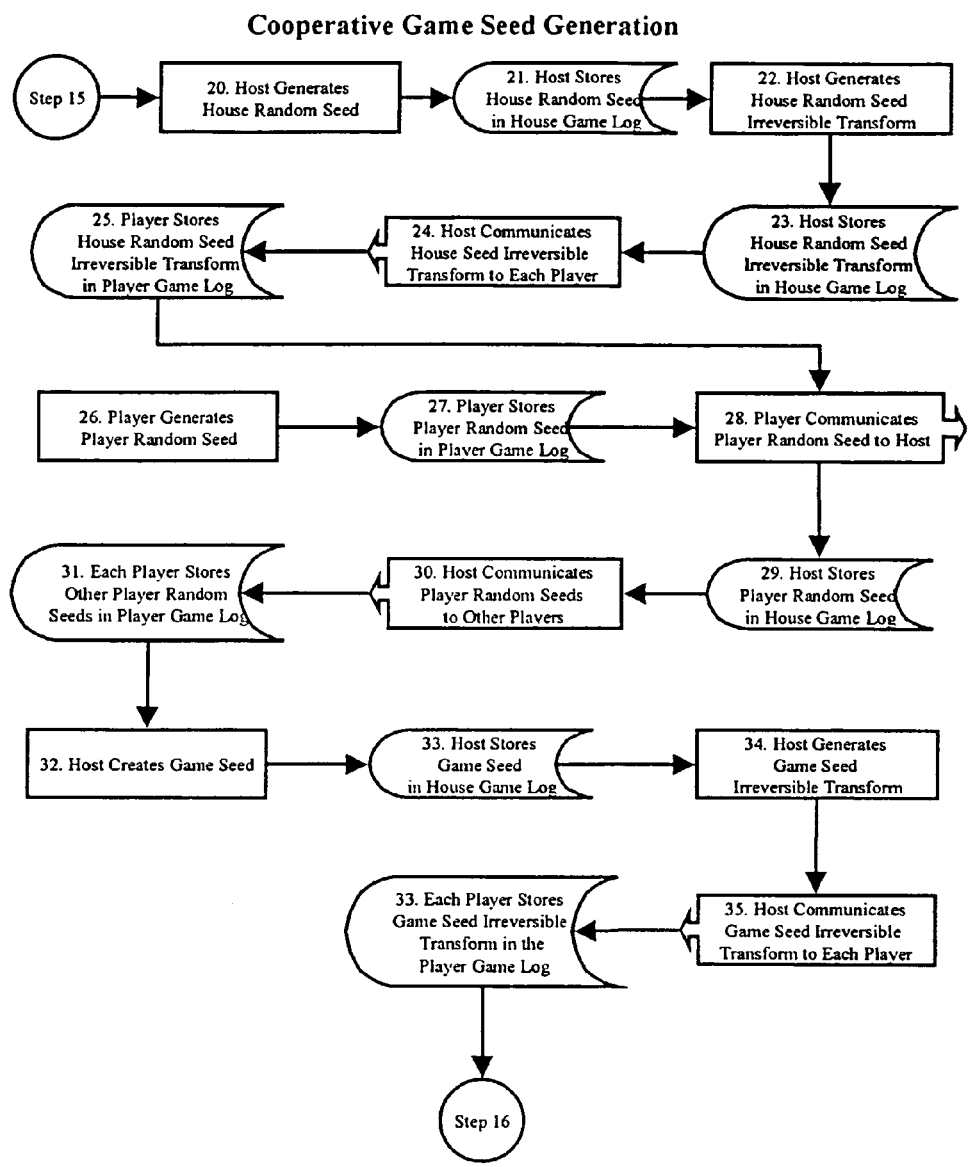

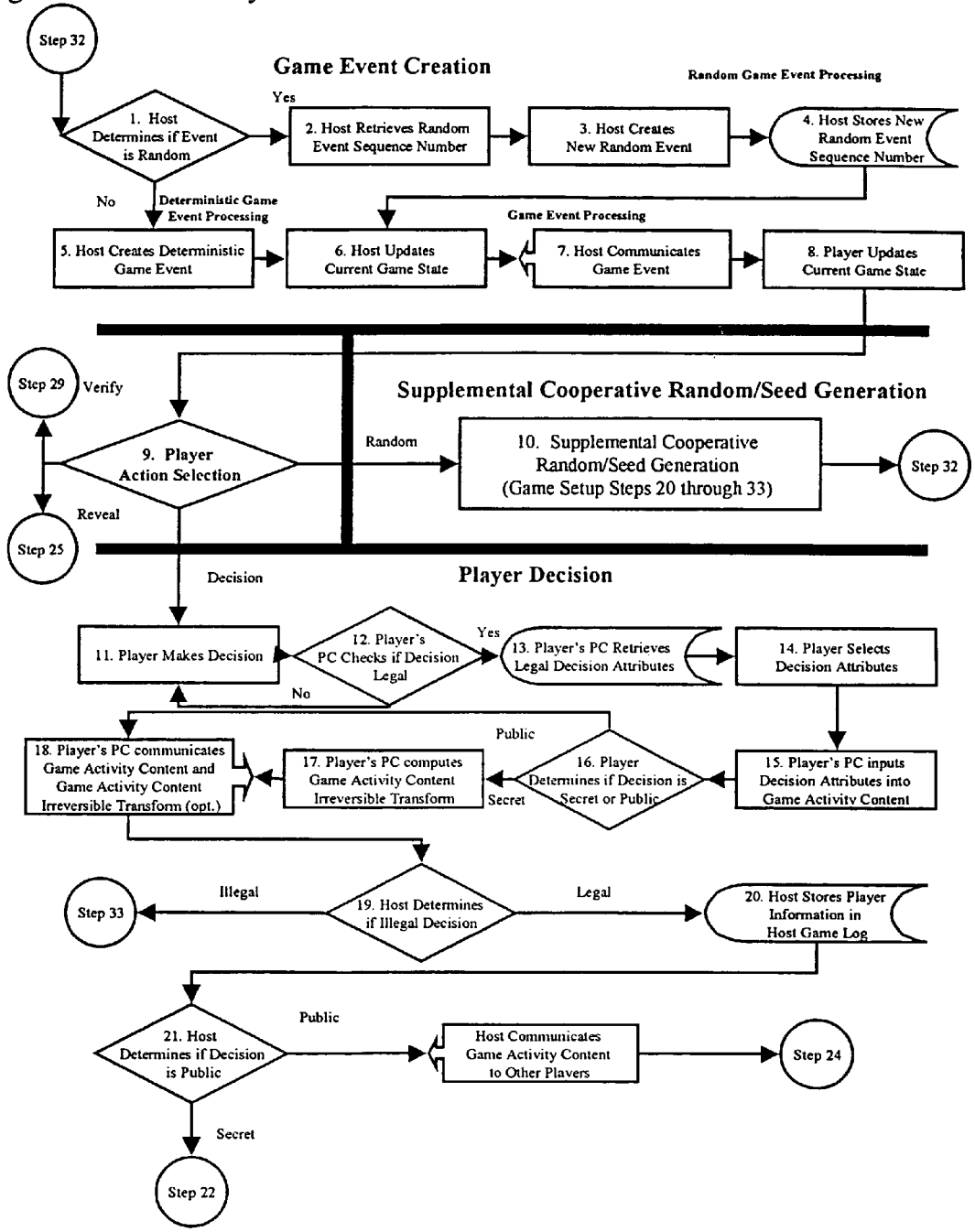
Figure 13: Game Play Flow-Chart

Figure 13: Game Play Flow-Chart (cont'd)
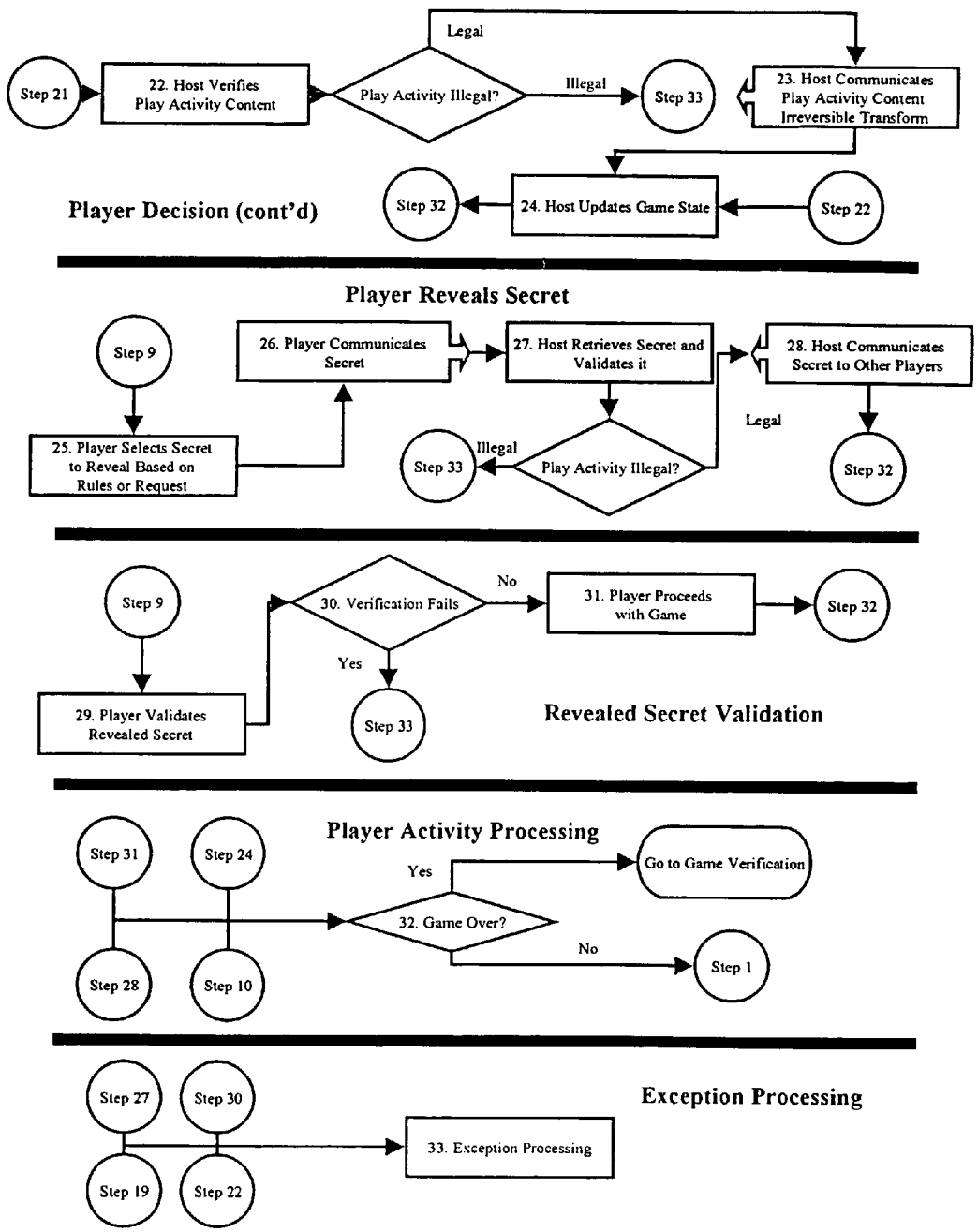

Figure 14: Game Verification Flow-Chart
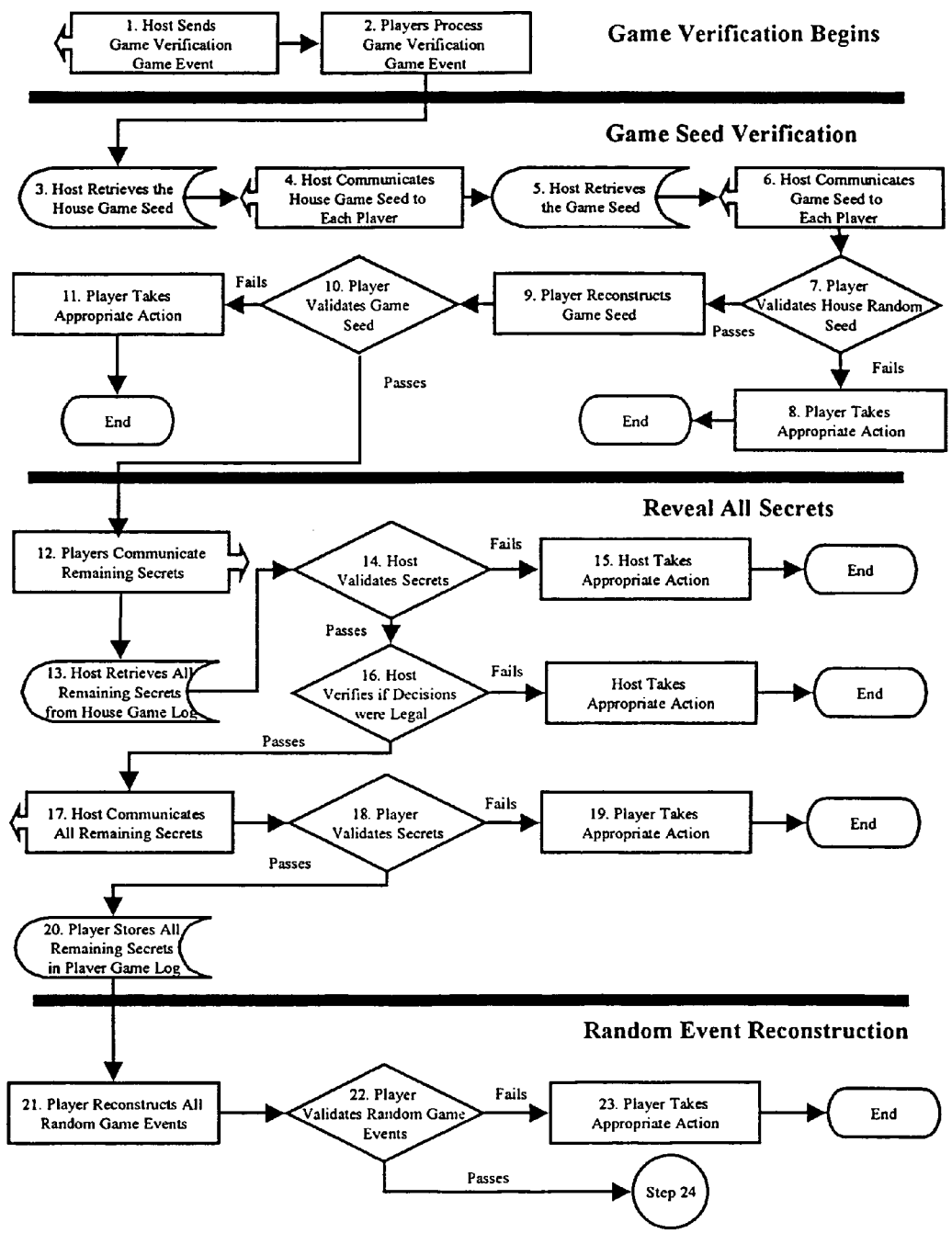

Figure 14: Game Verification Flow-Chart (cont'd)
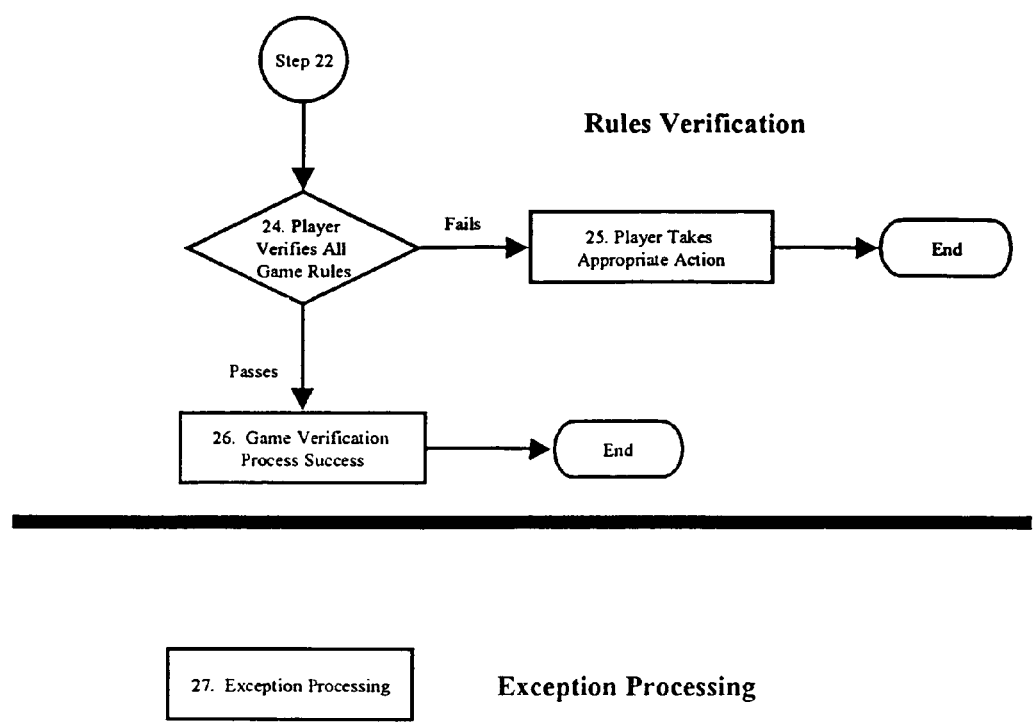

Figure 15: Host-Player Transaction Flow-Chart
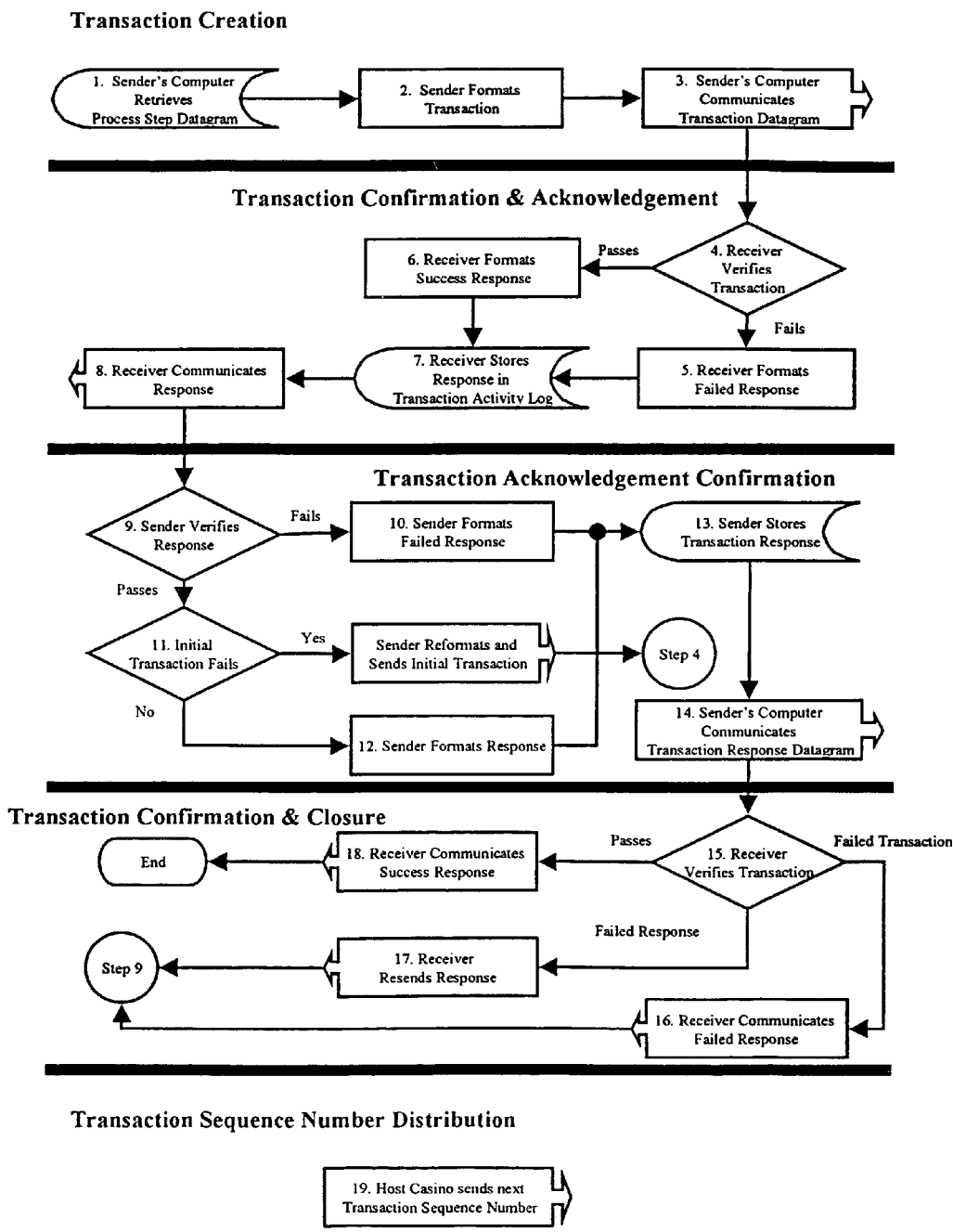

Figure 16: Secure Host-Player Communication Flow-Chart
At beginning of Session at the Casino
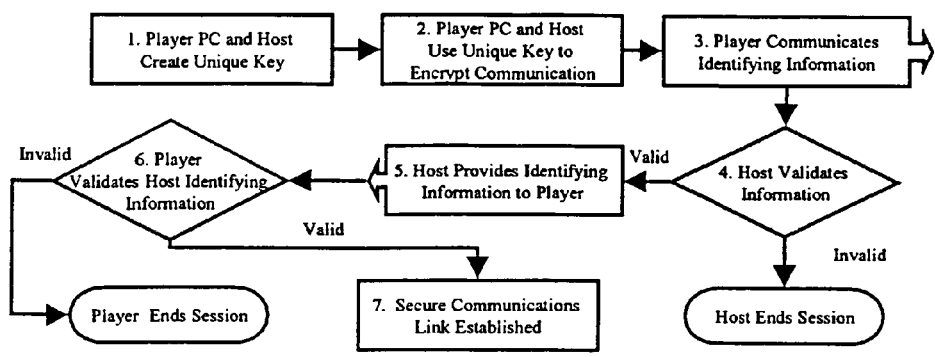
For Each Communication Between Player and Host Casino
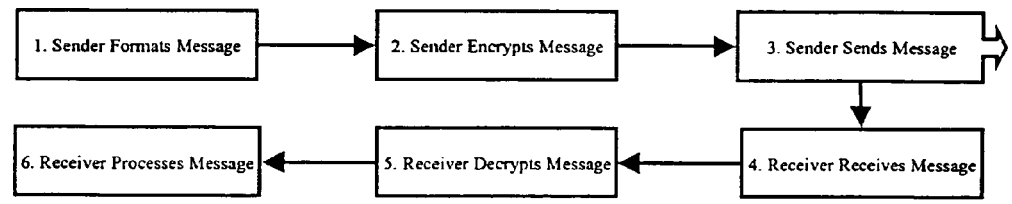
Exception Processing
7. Exception Processing

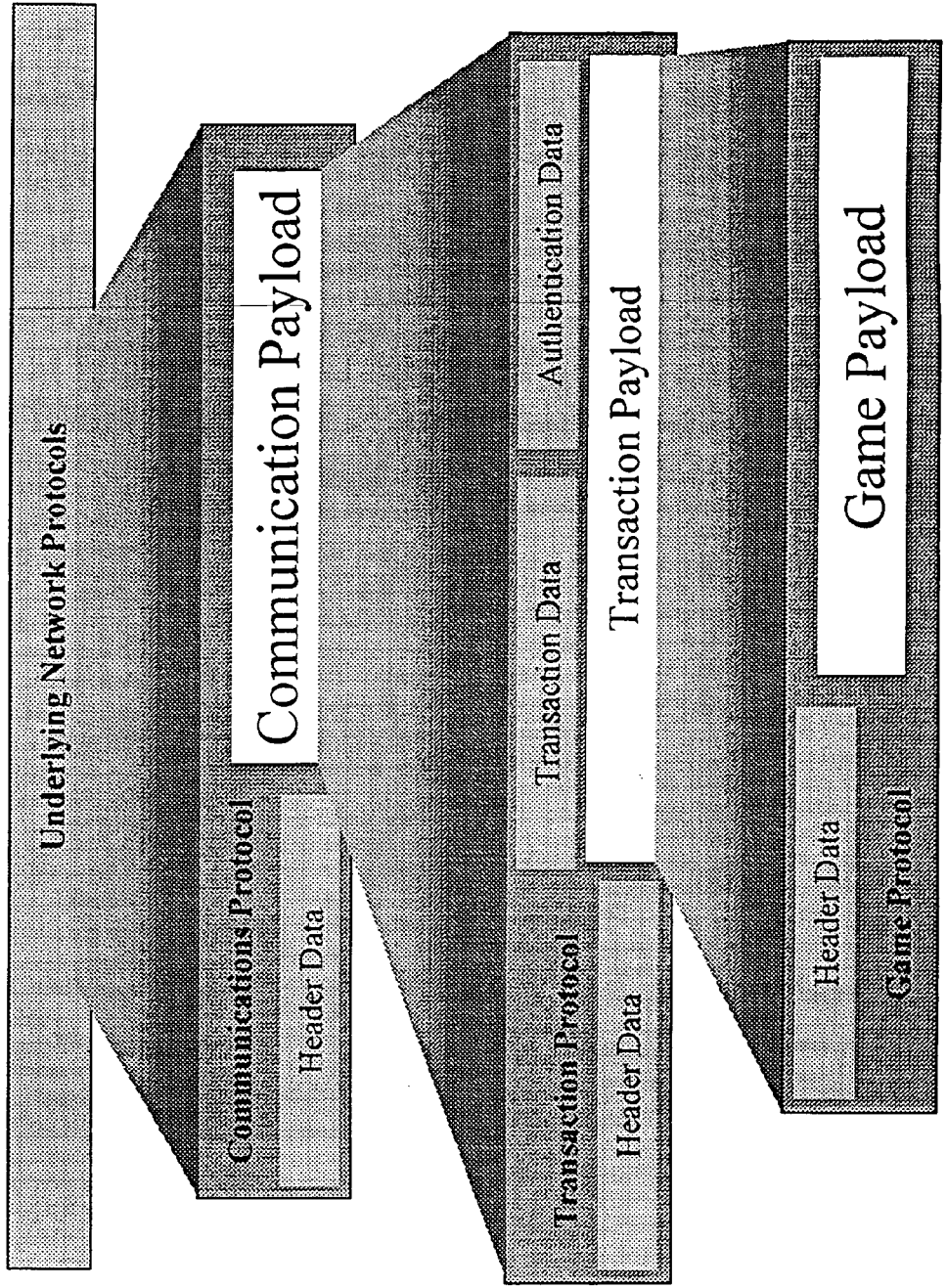
Figure 17. Protocols and Packets

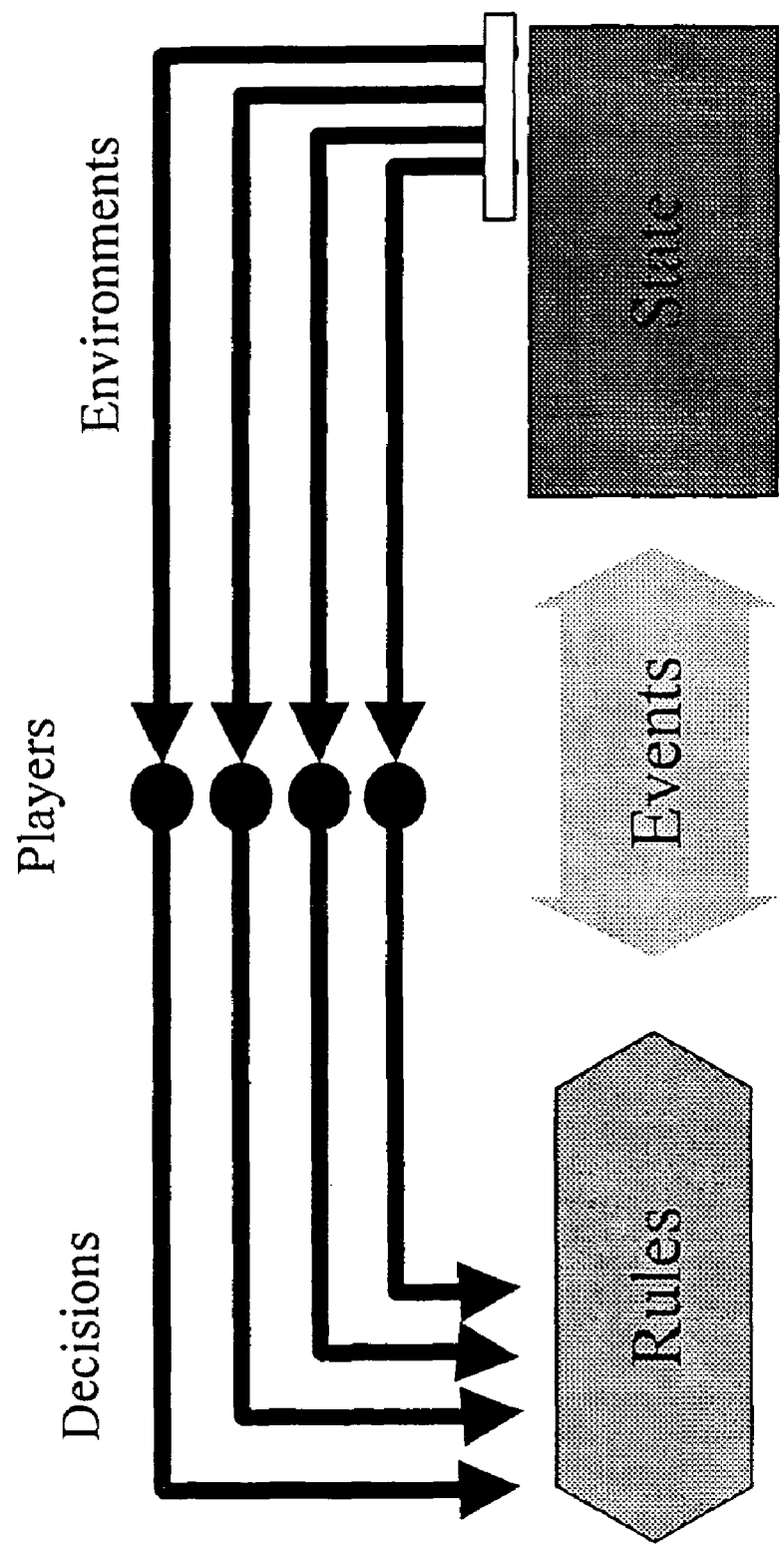
Figure 18. Generic Game Architecture

APPARATUS AND PROCESS FOR VERIFYING HONEST GAMING TRANSACTIONS OVER A COMMUNICATIONS NETWORK

This application is a continuation of U.S. patent application Ser. No. 09/477,451, filed Jan. 4, 2000, which issued as U.S. Pat. No. 6,165,072, and which is a continuation of U.S. patent application Ser. No. 08/921,520, filed Sep. 2, 1997, which issued as U.S. Pat. No. 6,030,288.

FIELD OF THE INVENTION

The present invention relates to apparatus and method for verifying honest gaming transactions over a communications network, and particularly for verifying gambling transactions over the Internet.

RELATED ART

Games and betting were probably two of mankind's first inventions with cheating coming quickly thereafter. Ever since, the seductive thrill of gambling has inspired a duel between cheaters and honest players and casinos. This war has resulted in elaborate inventions by both sides—shaved cards, loaded dice, and stacked decks versus pit bosses, video cameras, and gaming commissions. The attraction of easy money and the temptation to get that extra "edge" have created an environment where political and religious leaders have regulated or outlawed gambling. Today, governments closely regulate or even operate gambling businesses and it is a multi-billion dollar entertainment industry with many millions of players.

The Internet poses a new challenge and presents a new opportunity for the ancient art of gambling. The global network will allow people to play games of chance in their own city or across the world from the comfort of their home. This opportunity has excited many businesses and raised the concerns of governments. The specter of unregulated gambling over the Internet has raised, once again, calls for banning gambling for fear of cheating and abuse.

The network and computer technologies that created these problems have now an answer. Previous inventions attempted to address both the problem of cheating for games and support the play of games over a network—most notably U.S. Pat. No. 5,586,937. This patent and other patents before it have provided a means to distribute game information between computers or terminals and a host computer. At best, these patents provide privacy and some level of control of transactions between the host and the players. Though many of these patents talk about "fairness", they mainly protect the house from cheating or game manipulation by the players. Other existing network security and electronic commerce technologies also focus on providing privacy and integrity for sessions or transactions. The central problem of protecting players from cheating by the casino and independent verification remains.

Thus, what is needed is a system that protects individuals and enables regulation using existing computer and cryptographic capabilities in a novel way. Players should be able to use an ordinary home computer and software to play games of chance with full confidence that the casino is not cheating them in any way. Regulators should also be able to reassemble suspected a game to prove that the casino and players played the game honestly. Casinos themselves should be able to ensure that they are not being cheated by the players.

SUMMARY OF THE INVENTION

The present invention builds on the previous work but solves the problem of cheating by the casino or players. This solution, in fact, makes gambling via the Internet more trustable than going to a traditional legitimate casino. Players help create all random game events and review every game after it is over. This is equivalent to a card player being able to have a "second shuffle" after the casino before the game begins. After the game, the player can reconstruct the casino's shuffle to rebuild the entire "deal" of the cards.

An additional feature is the ability to support secret and simultaneous decisions. The simplest example of the use of this is the children's game Rock-Paper-Scissors. In this game, players make a simultaneous decision as to which of the three items the player will choose. The problem comes when players change their decision at the last moment after seeing what the other player has done. The new system allows players to make these kinds of decisions and reveal that they have made the decision without revealing the decision itself until it is required (choosing Scissors without revealing or being able to deny that one has chosen Scissors).

This invention implements these techniques by a combination of software on a player's personal computer and a casino's host computer connected over a communications network. The player's PC and the host computer communicate the distributed gaming information via a protocol described in this disclosure. These techniques are implemented in a separate layer of software that sits above any communications software and below the software for a specific game. This provides a "middleware" layer, much like the World Wide Web, to allow communications between players and casinos in the same way a web browser connects to a web server.

With the use of this invention, Internet gambling becomes not just technically feasible, but politically possible. Players will have the confidence to trust on-line casinos and governments will be able to regulate them. New gambling possibilities will be opened allowing entirely novel games built on the middleware and protocol described by this invention. The economic, social, and entertainment potential may be as unpredictable and limitless as the Internet itself.

According to a first aspect of the present invention, apparatus and method for verifying honest gaming transactions over a communications network includes structure and steps whereby a host processor creates a host random number and receives a random number from a satellite processor over the communications network, and generates a game seed based on the random number. The host computer also receives a game input from the satellite processor and generates a game result based on the game input, the game seed, and a predetermined set of game rules. A satellite processor provides the random number and the game input to the host processor over the communications network, and receives data corresponding to the game seed and the game result from the host processor. The satellite processor can then verify the honesty of the transaction by (i) generating a game result based on the game input, the data corresponding to the game seed, and the predetermined game rules, and (ii) comparing the generated game result with the received game result.

According to a second aspect of the present invention, apparatus and method for verifying honest gaming transactions over a communications network includes structure and steps whereby a host processor:

(i) determines a host random number;
(ii) provides an irreversible transform of the host random number to a satellite processor over the communications network;
(iii) receives a satellite random number from the satellite processor over the communications network;

(iv) generates a game seed from the host random number and the satellite random number;

(v) receives an arbitrary game decision input from the satellite processor;

(vi) stores the host random number, the satellite random number, the game seed, the arbitrary game decision input, and predetermined game rules;

(vii) generates a random event from the game seed;

(viii) produces a game result using the game decision input, the random event, and the predetermined game rules;

(ix) provides the game result to the satellite processor over the communications network; and (x) provides the host random number and the game seed to the satellite processor over the communications network.

A satellite processor:

(i) receives the host random number irreversible transform from the host processor over the communications network;

(ii) determines a satellite random number;

(iii) provides the satellite random number to the host processor over the communications network;

(iv) provides the arbitrary game decision input to the host processor;

(v) stores the host random number irreversible transform, the predetermined game rules, and the game decision input;

(vi) receives the game result from the host processor over the communications network;

(vii) receives the host random number and the game seed from the host processor; and (viii) verifies the game by (a) generating an irreversible transform of the received host random number, (b) comparing the generated transform with the previously stored host random number irreversible transform, (c) reconstructing the game seed from the host random number and the satellite random number, (d) generating a game result using the stored game decision input and the stored predetermined game rules, and (e) comparing the generated game result with the received game result.

Where a plurality of satellite processors are provided, each satellite processor will reconstruct the game seed utilizing the satellite random numbers from all the satellite processors.

BRIEF DESCRIPTION OF THE DRAWINGS

FIG. 1 shows the Generic Player/Game Architecture—a picture of the general framework for players and a casino or "house".

FIG. 2 shows the Player/Host Casino Middleware Architecture—a diagram depicting the relationship of the key elements of the invention client-server relationship.

FIG. 3 shows the Generic Physical Architecture—a diagram representing the typical physical components of the invention and their relationship.

FIG. 4 shows the Host Casino Functional Architecture—a diagram representing the functional elements of the host casino.

FIG. 5 shows the Host Casino Physical Architecture—a diagram representing the physical elements of the host casino and their relationships.

FIG. 6 shows the Player System Functional Architecture—a diagram representing the functional elements of the player system.

FIG. 7 shows the Player System Physical Architecture—a diagram representing the physical elements of the player system and their relationships.

FIG. 8 shows the Top-Level Process Relationships—a diagram depicting the relationship of the various top-level processes.

FIG. 9 shows the Top-Level Functional Flow—a diagram showing the top-level flow that would be used during the operation of the invention.

FIG. 10 shows the Key—a description of the elements used in the flow charts.

FIG. 11 shows the Player Registration Flow-Chart—a diagram depicting the flow of the Player Registration process.

FIG. 12 shows the Game Setup Flow-Chart—a diagram depicting the flow of the Game Setup process.

FIG. 13 shows the Game Play Flow-Chart—a diagram depicting the flow of the Game Play process.

FIG. 14 shows the Game Verification Flow Chart—a diagram depicting the flow of the Game Verification process.

FIG. 15 shows the Host-Player Transaction Flow-Chart—a diagram depicting the flow of the Host-Player Transaction process.

FIG. 16 shows the Secure Host-Player Communication Flow-Chart—a diagram depicting the flow of the Secure Host-Player Communication process.

FIG. 17 shows the Protocols and Packets—a picture showing how protocols are transmitted over a network and how protocols are nested within each other (also commonly called encapsulation or tunneling).

FIG. 18 shows the Generic Game Architecture—a picture of the elements of a game: events, decisions, rules, environment, data stores, and states.

DETAILED DESCRIPTION OF THE PREFERRED EMBODIMENTS

1. Introduction

The subject application describes a protocol between the player's and casino's computers that allows the players to "shuffle the deck" for all game events, play the game, and rebuild all game events after the game is over. By eliminating many forms of cheating and allowing any suspected game to be reviewed, this system will make Internet gambling safe and secure—significantly reducing the objections of many doubting governments, wary consumers, and cautious businesses. This technology may also be applicable for other types of transactions over the Internet and other networks and may enable different implementations of games and gambling activities within casinos.

This disclosure defines an embodiment of a distributed transaction processing system with provable honesty where the application is Internet gambling—clients are players gambling using an automated host casino. The core transaction system middleware implemented by software on the player's computer communicates using a unique gaming protocol with the host casino computer. The unique portions of the game application (for blackjack, craps, or new games) rides on top of this common middleware layer to implement this honest gambling system.

2. The Embodiment

The overall functional architecture of the distributed gaming system comprises one or more players and a casino (FIG. 1). As shown in the figure, all interactions go through the host casino including interactions between players. Another way of looking at the functional architecture is that there is a client player game application, a server host game application, and the distributed gaming system "middleware" application with the network gaming protocol (FIG. 2).

This architecture could be implemented by a host computer that provides communications to player computers via one of three means: direct connection via a local area network, telephone link via a modem, or a wide area network connection such as the Internet (FIG. 3).

The host casino system comprises a number of applications that may be implemented on one or more computers: a front-end such as a web server, an accounting system, a the game verification system, a registration system, an audit system, a customer service system, and a game manager that supports the game protocol and controls multiple game application sessions (FIG. 4). This is implemented on a platform that includes a display, a computer processor and operating system, an input device such as a keyboard, a mass storage system such as a hard disk, a communication device, and an archive for long term storage (FIG. 5).

The player system comprises a game protocol package, the game verification application, and one or more game applications (FIG. 6). The player platform comprises a display and operating system, an input device such as a keyboard, a computer processor with operating system, a mass storage system such as a hard disk, and a communication device (FIG. 7).

There are four major processes implemented by this invention: player registration, game setup, game play, and game verification. There are two supporting processes that will also be described in detail: secure host-player communication and host-player transactions. These processes encapsulate each other and the core game processes—the core game processes are carried within the transaction process and the transaction process is carried inside the communication process (FIG. 8). The exchange of information between players and host casinos for these 6 processes together constitute the Network Gaming Transaction Processing Protocol. Other processes that are likely to be implemented are processes for accounting for financial transactions between players and hosts, software distribution for providing game and middleware protocol software to players, and customer service to address customer problems.

Player registration is the process where a player contacts the host casino to set up an account to be able to play (Section 2.1). The player also signs a contract with the casino to set up the terms and agreements needed to ensure that the player understands both the rules of the casino for betting, playing games, depositing and redeeming funds, as well as the procedures to address dropped, broken, or lost network connections and other issues that occur in computer and network games that do not occur at a casino.

Game setup is the process where a registered player connects to the host casino and selects a game to play (Section 2.2). This process also includes the exchange and establishment of the initial parameters of a game. This process additionally handles the setup and entry into multi-player games such as poker.

Game play is the process where a registered player who has completed the game setup process plays a game on-line (Section 2.3). This includes the processing of player decisions by the host casino and the communication of game events by the host casino to the player. This process also includes some incremental verification to ensure that the game rules are being followed and take appropriate action if they are not.

Game verification is the process of reconstructing the game events and parameters to ensure that no cheating occurred (Section 2.4). This can be done by any player as well as by the casino or an independent auditor or regulator. The random sequence that was created during the game will be reconstructed using the deterministic randomization process and Cooperative Random/Seed Generation process (Section 3.4.4). Also during this process, all secrets from the game are revealed and verified. These secrets, combined with an audit record of all observed game events, allow the complete reconstruction of all activities during the game to verify that no cheating had occurred and, if it did, what was done and by whom. The game verification process enables the provable honesty capability.

The host-player transaction process provides confidence to the player and the host casino that all information (particularly information from the game processes) is received properly (see Section 2.5). This transaction process is built upon well-known "handshake" protocols for the reliable exchange of data with the addition of the use of a cryptographic signature function such as the US Digital Signature Standard (Section 3.4.3). This function provides very strong assurance that game process information is correct and was generated either by the participating player or the host casino. This process can be removed provided some other mechanism or agreement is in place to provide its confidence and "non-repudiation" functions. The process steps that need to be protected by the host-player transaction process are clearly indicated in the drawings.

Secure host-player communication is the process where a player sets up a communication connection with a host casino. This process provides privacy for their communications as well as confidence of the identity of the participants in the process—the player knows that she is communicating with the specific casino and the casino knows that it is communicating with the specific player (Section 2.6). This process is used for all communications between the host casino and the individual player. If the player is participating in a game where player-to-player communication is allowed, the host casino uses the communication process to forward these communications between players—there is no direct communication between players (FIG. 1). There are commercial and well-known products such as the Secure Socket Layer protocol that can be used to provide this service. If the communication occurs within a casino or other location or in a circumstance wherein privacy is not a concern, the identification function of this process is still necessary. The process steps that need to be protected by the secure host-player communication process are highlighted in the drawings.

There are several techniques and concepts that provide the theory for why this invention works. They are noted as they occur during the detailed descriptions below and are described in a separate section of this application (Section 3). The topics are:

Game Transaction Processing System Architecture—a method for breaking down most game transaction processing systems into a set of elements that make the processing of transaction processes activities easier to automate. (Section 3.1)

Trusted Referee Model—an approach for arbitrating rule-based systems such as games and validating honest game play during or after a game. (Section 3.2)

Honesty Model—an explanation of the strengths and limitations of the system for ensuring honesty. (Section 3.3)

Randomizers—the computer devices or algorithms and means for generating unpredictable outcomes similar to dice or cards. (Section 3.4.1)

Irreversible Transforms—a mathematical function that has the characteristic that it is difficult to reconstruct the input data even if the output of the function is known (a simple example would be that of a phone book—it is easy to find a phone number for a given name, but it is very hard to find the name if all that is possessed is the phone number and a copy of the phonebook). (Section 3.4.2)

Signatures and Hash Functions—a method for providing confidence that data has not been manipulated and that it was created by some specific individual. (Section 3.4.3)

Cooperative Seed/Random Generation—a method for creating random numbers that has the effect of allowing a player to electronically "shuffle cards" jointly with the house while allowing the resulting random sequence of "cards" to be recomputed after the game ends. (Section 3.4.4)

See also "Applied Cryptography", Second Edition, by Bruce Schneider, 1995, incorporated herein by reference.

Another feature that is used throughout this presentation is the Log. A Log is a means of storing sequential information to record and preserve data of interest. A person's diary or checkbooks are examples of data logs.

The overall utility of this invention can best be understood by the process of a person deciding to gamble at a casino, registering at the casino, selecting a game to play, playing a game, and checking the game to see that she was not cheated (FIG. 9). The sequence described below assumes that the player already possesses the necessary computer, software, and other basic materials to connect to the host casino.

2.1 Player Registration

Player registration is the process that a person follows first once they make the decision to play at a host casino (FIG. 11). The data to be used for this process is detailed in Table 1.

TABLE 1

PLAYER REGISTRATION DATAGRAM CONTENTS

| FIELD NAME | DESCRIPTION | DATA TYPE |
|---|---|---|
| HEADER DATA | | |
| Player ID | A unique identifier for the player | Integer |
| House ID | A unique identifier for the house | Integer |
| REGISTRATION PAYLOAD | | |
| Registration Content | The registration datagram used to send all for the registration step information | Data structure |
| Registration Exception Information | An error code used for notifying other party(ies) of any exceptions to the proper execution of the process | Data structure |

Player Registration Start

1. The player uses her PC to contact the host casino registration application.
2. Next, the host casino registration application responds to the player's PC with information summarizing the terms and conditions for playing. This includes information on topics such as betting, playing games, depositing and redeeming funds, as well as the procedures to address dropped, broken, or lost network connections and other issues. The host casino provides the initial Transaction Sequence Number to the player's PC (Section 2.5).
3. If the player decides to accept the terms, she uses her PC to notify the host casino.

Player Account Establishment

4. The host casino then prompts the player's PC for identifying information as well as financial data. The financial data could include information such as account numbers, amount to transfer or deposit, as well as other methods of payment and receipt of winnings.
5. The player uses her PC to provide her name and other requested information to the host casino.
6. The host casino processes the identifying and financial information.
7. If there are legal, financial, or other problems with the information that the player provided, the host casino will communicate the problems to the player's PC to allow for corrections by the player, if possible (return to step 5).
8. If there are no problems, the host casino stores the information in its account database.

Player Unique Identification Information Distribution

9. The host casino will generate any unique identifying information such as a password, keys for the secure host-player communication protocol, and keys for the digital signature function.
10. The host casino will communicate this unique identifying information to the player's PC. The host casino will also provide information so that the player's PC can identify that it is communicating with the host casino.
11. The player's PC will store the unique identifying information.

Formal Contract Creation

12. The host casino will provide the player via the PC with the formal contract including all of the detailed terms and conditions for use of the casino. This contract may need to be sent and processed via ordinary mail, depending on legal and regulatory requirements.
13. If the player does not agree to the contract, then the player uses her PC to send that message to the host casino where all previously stored information is deleted and no account is created for the person.
14. If the player does agree to the contract, then the player uses her PC to send that message to a PC and an account is created and stored and the player can proceed to Game Setup.

2.2 Game Setup

Game Setup is the process where a registered player connects to the host casino, selects a game to play, and initializes the game (FIG. 12). The data requirements for this process are shown in Table 2.

TABLE 2

GAME SETUP DATAGRAM CONTENTS

| FIELD NAME | DESCRIPTION | DATA TYPE |
|---|---|---|
| HEADER | | |
| Player ID | A unique identifier for the player | Integer |
| Other Player ID Set | A list of unique identifiers for all players in the game | Set of integers |
| House ID | A unique identifier for the host casino | Integer |
| Game Rules Identifier | The ordinary name of the game | Enumerated list of allowable games recognized by the house |

TABLE 2-continued

GAME SETUP DATAGRAM CONTENTS

| FIELD NAME | DESCRIPTION | DATA TYPE |
| --- | --- | --- |
| Game Name | A unique identifier for the type of game being played | Enumerated list of allowable games recognized by the house |
| Game ID | A unique identifier for the specific game being played | Integer |
| Game Activity Sequence Number | A unique number for the event or decision within a specific game. Established only by the house. Not defined until the transaction is acknowledged. | Integer |
| Setup Activity Type | A value identifying whether this is the game establishment or cooperative random generation activity. | Enumerated list (Establish, Random Generation) |

GAME PROTOCOL SETUP PAYLOAD

| | | |
| --- | --- | --- |
| Game Protocol Setup Exception Information | Notification to all players as well as the house of any exceptions to the proper execution of the game protocol | Data structure[1] |

The following additional information is used for cooperative random generation only:

| | | |
| --- | --- | --- |
| Player Random Seed | A random number provided by a player to the host casino for use in cooperative random generation | Binary Sequence - defined only for player communications with house |
| Player Random Seed Set | A set of pairwise data (player ID, random seed) that identifies the random numbers provided by a set of players having Player ID(s) for use in cooperative random generation. This is used by the host casino during the setup phase and is stored by the other players until the verification phase. | Set of ordered pairs of integers and Binary Sequence |
| House Random Seed | A random number generated by the house for use in cooperative random generation. The host casino stores the House Random Key. It is not provided to the player(s) until the Game Verification Process. | Binary Sequence |
| House Random Seed Irreversible Transform | The irreversible transform of the random seed used by the host casino for cooperative random generation. This is provided to the players during this phase as is used by the players during the Game Verification process. This information is stored by both the individual players and the host casino. | Binary Sequence |
| Game Seed | The seed created by the cooperative random/seed generation process that is actually used for creating deterministic random data for use during the game. It is stored and used by the host casino during the Game Play process. This seed is not provided to the players until the Game Verification process. | Binary Sequence |

[1]Data structure unique to the game protocol and any other standards or commercial technologies (operating system, error handling libraries, etc.) employed.

Game Setup Begins
1. The player decides to play a game at the host casino.
2. The player uses her PC to connect to the host casino.

Player Account Validation
3. The host casino prompts the player via her PC for her account information as well as some identification information. If this is the beginning of the session with the host casino, the host casino provides the player's PC with the initial Transaction Sequence Number. (Section 2.5)
4. The player uses her PC to provide the host casino with her account and identification information. The player's PC may have stored some or all of the account and identification information and may send this information either automatically when the player's PC connects to the host casino or when prompted by the host casino.
5. The host casino validates the provided account and identification information against its accounting database.
6. If the validation fails, the host casino may prompt the player via her PC to attempt to re-enter her account and identification information (go to step 3) or the host casino may terminate the connection.

Player Game Selection
7. If the validation passes, the host casino prompts the player via her PC with the available options including the option to select a game.
8. The player's PC then communicates her decision to the host casino.
9. If the player decides to do something besides play a game, the host casino will service those options and then prompt the player again via her PC (go to Step 7).
10. If the player decides to play a game, the host casino communicates a list of available games to the player's PC.

Some of the criteria that may be selectable at this time in addition to the specific game to be played may include starting or joining a multi-player game. This includes both the Game Name and the Game Rules Identifier. Game Names could include: blackjack, craps, and poker, while Game Rules Identifier could include how many decks are used for blackjack, what kinds of bets are allowed in craps, and which game of poker is being played (or which games are allowed) as well as whether player interaction is permitted. The player's PC sends both the Game Name and the Game Rules Identifier to ensure that the player and the host are using the same rules. If the player's PC's Game Rules Identifier is different than that sent by the host casino, then go to Game Setup Exception Processing (Step 37).

11. The player uses her PC to communicate her decision to the house.

Casino Game Setup
12. The host casino creates all of the initial attributes of the selected game. This includes the attributes listed in Table 2—most notably the Game ID and Game Sequence Number. An additional attribute is a unique Game Rules Identifier that is used to ensure that the player's PC and the host casino are using the same game rules.
13. The host casino will store these attributes in the House Game Log to support Game Verification and for use during the course of the game to track the game's state. The host casino will create a House Game Log for each game played.
14. The host casino will load or activate a session of the selected game application to allow it to support the player's play of the game.

15. If the game selected by the player uses random events such as dice or cards, the host casino will carry out the Cooperative Random/Seed Generation process (see Step 20).
16. The host casino communicates the game attributes to the player via her PC.

Player Game Setup

17. The player's PC will use the parameters provided by the host casino to establish the initial game state. The player's PC will store these attributes for use during the course of the game to track the game's state. The player's PC may load the game environment that provides the visual, audio, and other information to allow easy and entertaining play of the game. The player's PC will also verify the Game Rules Identifier is the same for the local copy of the game rules.
18. The player's PC will store the initial parameters in the Player Game Log for use later during Game Verification.
19. The host casino and the player will move into the Game Play process.

Cooperative Game Seed Generation

20. The host casino begins the Cooperative Random/Seed Generation process by generating an internal random value called the House Random Seed. This is done using a true randomizer or a local deterministic randomization process.
21. The host casino stores the House Random Seed in the House Game Log.
22. The host casino takes the House Random Seed that it generated and creates an irreversible transform of it—called the House Random Seed Irreversible Transform, using a predetermined irreversible transform function.
23. The host casino will store the House Random Seed Irreversible Transform in the House Game Log.
24. The host casino will communicate the House Random Seed Irreversible Transform to the player(s).
25. Each player's PC will store the House Random Seed Irreversible Transform in her respective Player Game Log.
26. Each player's PC begins the Cooperative Random/Seed Generation process by generating an internal random value called the Player Random Seed. This is done using a true randomizer or a local deterministic randomization process. Note: this can be done independently and at the same time as the host casino generates its random seed. The player's PC may carry out its portions of the Cooperative Random/Seed Generation process either automatically or with intervention by the player.
27. Each player's PC stores the individual Player Random Seed in her respective Player Game Log.
28. After receiving the House Random Seed Irreversible Transform, each player's PC communicates her Player Random Seed to the host casino.
29. The host casino stores each player's Player Random Seed in the House Game Log.
30. The host casino communicates all of the Player Random Seeds to each of the player's PCs.
31. Each player's PC will store all of the other Player Random Seeds that she receives in her Player Game Log.
32. The host casino will use the entire set of Player Random Seeds in combination with its own House Random Seed to create the Game Seed (see Section 3.4.4). This seed is used for creation of the subsequent random events during the Game Play process.
33. The host casino will store the Game Seed in the House Game Log.
34. The host casino will compute the irreversible transform of the Game Seed—called the Game Seed Irreversible Transform.
35. The host casino will communicate the Game Seed Irreversible Transform to each of the player's Pcs.
36. Each player's PC stores the Game Seed Irreversible Transform in her Player Game Log (Go to Step 16)

Game Setup Exception Handling

37. The host casino or player's Pcs will notify the other participants in the game of any failures that occur during the Game Setup process. These failures will be logged in the appropriate Game Logs as well as the Exception Logs. Failures will result in processing either to restart the Game Setup process, restore the Game Setup process to some known state, or end the process and game session. This processing will be determined by the game rules and the formal contract that the player agreed to when she registered with the host casino.

2.3 Game Play

Game Play is the process allowing the actual play of the game by communication of player, house, and game decisions, supplemental seed generation, events, and bets (FIG. 13). The data requirements for this process are shown in Table 3.

TABLE 3

GAME PLAY DATAGRAM CONTENTS

| FIELD NAME | DESCRIPTION | DATA TYPE |
|---|---|---|
| HEADER | | |
| Player ID | A unique identifier for the player | Integer |
| Other Player ID Set | A list of unique identifiers for all players in the game | Set of integers |
| House ID | A unique identifier for the house | Integer |
| Game Rules Identifier | The ordinary name of the game | Enumerated list of allowable games recognized by the house |
| Game Activity Sequence Number | A unique number for the event or decision within a specific game. Established only by the house. Not defined until the transaction is acknowledged. | Integer |
| Play Activity Type | Identifies whether this is an event, seed generation, decision, reveal | Enumerated list (event, seed, decision, reveal) |
| Play Activity Source ID | The ID of an initiator of the activity, whether the player or the house | Integer |
| Play Activity Confidentiality | Identifies whether the activity is secret or public | Enumerated list (secret, public) |
| Play Activity Random | Identifies whether the activity is randomly generated or not | Boolean |

TABLE 3-continued

GAME PLAY DATAGRAM CONTENTS

| FIELD NAME | DESCRIPTION | DATA TYPE |
|---|---|---|
| HEADER | | |
| GAME PLAY PROTOCOL PAYLOAD | | |
| Player Random Seed | A random number provided by a player for use in cooperative random generation | Binary Sequence - defined only for player communications with house |
| Player Random Seed Set | A set of pairwise data (player ID, random seed) that identifies the random numbers provided by a set of players having Player ID(s) for use in cooperative random generation | Set of ordered pairs of integers and Binary Sequence |
| Play Activity Content | The contents of the event, decision, or reveal activity | Data structure[1] |
| Play Activity Content Irreversible Transform | The irreversible transform of the content of the event, decision, reveal, or bet activity | Data structure |
| Game Protocol Play Exception Information | Notification to all players as well as the house of any exceptions to the proper execution of the game protocol | Data structure[2] |

[1] Data structure unique to the player decision, to include all supporting parameters - see narrative for content examples.
[2] Data structure unique to gaming environment and selected communications protocol.

The host casino will log all player and host casino activities (game events, player decisions, and exceptions). The player has the option of logging all activities that she sees during the course of the game on her PC—it is most likely the player will log all activities that her PC sees. The general flow of the Game Play process is a series of game events and player decisions. The process begins with the host casino creating game events and communicating the game event or resulting change in Game State to the player. A Game Event in poker would be "Player X was dealt a card face down" to all players except player X who would get to see the contents of the card. The Game State is the complete picture of where all of the cards are, who has them, and who can see their contents. The player then responds with a decision and communicates it back to the host casino. This sequence continues until the end of the game.

Game Event Creation

1. The host casino checks the Current Game State, the game rules, and player or players decisions to create a game event. There are two types of game events—random and deterministic. Random events include actions such as dealing a card to a player or rolling dice while deterministic events include actions such as moving a piece on a board or placing a bet.

Random Game Event Processing

2. If the game event is a Random Game Event, the host casino retrieves a Random Event Sequence Number. If the Game Event is the first Game. Event, the value is set to a known initial value. A roll of the dice or a card dealt to a player is an example of Random Game Events.
3. The host casino uses the Game Seed and the retrieved Random Event Sequence Number (see Section 3.4.1) to create a Random Game Event. Note that the Random Event Sequence Number generation process is known to all of the players and the host casino prior to the game. It is also possible to generate every Random Event using a separate cooperative random event generation process. This has an advantage against certain forms of casino player collusion.
4. The host casino will increment the Random Event Sequence Number and store it to be used to create subsequent Random Game Events. (Go to Step 6).

Deterministic Game Event Processing

5. If the game event is a Deterministic Game Event, the host casino creates the Deterministic Game Event. The move of a chess piece is an example of a Deterministic Game Event. The end of the game is a Deterministic Game Event (go to Step 32).

Game Event Processing

6. The host casino uses the Game Event to update the Current Game State.
7. The host casino communicates either the Game Event or the Current Game State to the player's Pcs. Note that in some cases, only a portion of the Current Game State is communicated to each player's PC and it may be a different portion (such as poker where everyone knows that a card has been dealt, but only one player knows the content of a dealt card—the other players know the fact that an event occurred, but not its complete details).
8. Each player's PC will update its knowledge of the Current Game State based on the received Game Event or Game State update. Where possible, the player's PC will also review the Game State to see if it is consistent with the Game Rules.

Player Action Selection

9. A player can choose one of four types of actions: Supplemental Cooperative Random/Seed Generation (Step 10), Player Decision (Steps 11 through 24), Reveal Secret (Step 25 through 27), or Verify Secret (Steps 29 through 30). Supplemental Cooperative Random/Seed Generation would include events such as re-shuffling a deck of cards in poker or blackjack.

Supplemental Cooperative/Random Seed Generation

10. Supplemental Cooperative Random/Seed Generation is either initiated by a player or by the host casino. The process is identical to that described within the Game Setup process (Steps 20 through 36) and is used to create a Supplemental Game Seed. This activity is similar to the request for a "new deck" in card games or "fresh dice" in craps. This process can either be implemented visibly or transparently to the player (the application on the player's PC completes all of the steps without displaying any of the process steps—regardless, the information will be logged in the Player Game Log). (Go to Step 32).

Player Decision

11. A player makes a decision from the set of possible decisions presented to her by her PC or from the host casino based upon the Current Game State and the Game Rules.

The Game Rules are a series of predetermined process steps for producing a game result based on player inputs and common rules. For example, blackjack game rules will sequentially deal cards to each player, allow a player to "hit" or "pass", "bust" a player whose card total exceeds 21, allow for "splitting" of hands, etc. Any version of available gaming software may be adapted to be used as the Game Rules. Player decisions can either be deterministic activities (such as bets or moves of game pieces or bids in auctions or trading sessions) or requests for the host casino to create a random event (such as the roll of dice). Since all random events are actually implemented at the host casino, the player "asks" the casino to create the random event—in craps, this is equivalent to a player asking the croupier to roll the dice.

12. If the decision that a player attempts to make is not legal, the player's PC will reject the decision.
13. The player's PC retrieves the legal decision attributes. There are several attributes that a Player Decision can have (see Table 3). The allowable attributes are subject to the Game Rules and Current Game State. The decision can either be Public or Secret. The decision has a "Decision Type" based on the game rules such as "Bet", "Select a Card", "Draw Cards", "Roll Dice", etc. The Decision Type may allow multiple values—a "Draw Cards" decision could have a parameter to allow some specific number of cards to be draws: "Draw 3 Cards". For Secret Decisions, there is an additional value—the "Play Activity Content Irreversible Transform"
14. The player determines the Decision Type and Decision Value and selects or inputs them into her PC.
15. The player's PC inserts the Decision Type and Decision Value into the Game Activity Content.
16. The player determines if the decision is Secret or Public and inputs that information into her PC. Secret decisions are known only to the player and the house. This may be determined automatically by the player's PC based upon the Game Rules. Since the information that a player makes a secret decision may be useful to other players in certain games, this can be protected by a "NO DECISION" decision that is placed in the Game Activity Content. Secret decisions could be secret moves or piece placement. The game "Battleship" is a familiar example of a game with secret piece placement.
17. If the decision is Secret, the player's PC computes the Game Activity Content Irreversible Transform.
18. The player's PC communicates the Game Activity Content to the host casino. If the decision was Secret, the player's PC also communicates the Game Activity Irreversible Transform to the host casino. Note—some games may support secret decisions that are not shared with the host casino until either later in the game during a subsequent "reveal secret" activity or until the Game Verification process. This characteristic is also true of games without a host computer.
19. If the Game Activity Content indicates an illegal decision, the host casino will reject the decision and take appropriate actions in accordance with the casino's formal contract (go to Step 33).
20. The host casino stores this information in the House Game Log.
21. If the decision was Public, the host casino will communicate the Game Activity Content to the other players— depending on the Game Rules. This may either be done by forwarding the Game Activity Content or by sending a Game Event or updated Game State. Where possible, the other players will perform a real-time review the legality of the forwarded decision. If the decision is illegal, the players will notify the host casino immediately and store the information in the Player Game Logs and Player Exception Logs. Other actions taken will be done in accordance with the casino's formal contract (go to Step 24).
22. If the decision was Secret, the host casino will verify that the Play Activity Content was used to create the Play Activity Content Irreversible Transform. If the verification fails, the host casino will reject the decision and take appropriate steps based upon the casino's formal contract and Game Rules.
23. The host casino will send the Game Activity Content Irreversible Transform to the other players—depending on the Game Rules.
24. The host casino uses this information to update the Game State in accordance with the Game Rules and continues the game (go to Step 32).

Player Reveals Secret

25. Secrets are revealed when required under the rules or at the discretion of a player. Players may, depending on the game rules, also request other players to reveal secrets. Secrets are player decisions that are known only to the player that created the secret and the house (see Steps 16 through 18). Using the previous example of "Battleship", when a ship is sunk, a player reveals its location by sending the set of locations that together make up the ship's position on the board.
26. If a player decides to reveal a secret, she uses her PC to communicate the specific secret to the host casino using the secret decision's Game Activity Sequence Number as a minimum. Depending on the Game Rules, secrets can be revealed to one, some, or all of the other players.
27. The secret is actually revealed by the host casino. The host casino checks the Game Activity Sequence Number to determine if the secret can be revealed under the Game Rules. If the secret cannot be revealed, the host casino takes appropriate action based upon the Game Rules and casino's formal contract (go to Step 33).
28. The host casino communicates the Game Play data corresponding to the Game Activity Content of the secret decision to the appropriate player's Pcs (go to Step 32).

Revealed Secret Validation

29. Players' Pcs receiving the Game Activity Content for another player's secret decision compute the irreversible transform of the received Game Activity Content and compare it with the Game Activity Content Irreversible Transform that the player had received earlier in the game.
30. If the verification fails, the player uses her PC to notify the host casino and take appropriate action based upon the casino's formal contract and any regulatory options (go to Step 33).
31. If the verification passes, the player proceeds with the game.

Player Activity Processing

32. This sequence continues (go to Step 1) until the game ends and the host casino provides a game result to all players. The casino and players then may move into the Game Verification process.

Game Play Exception Processing

33. The host casino or player's Pcs will notify the other participants in the game of any failures that occur during the Game Play process. These failures will be logged in the appropriate Game Logs as well as the Exception Logs. Failures will result in processing either to restart the Game Play process, restore the Game Play process to some known state, or end the process and game session. This processing will be determined by the game rules and the formal contract that the player agreed to when she registered with the host casino.

2.4 Game Verification

Game Verification is the confirmation of the correctness of an entire game after the game is complete. It comprises a series of steps beginning with the revealing of any secrets from the game and ending with verification that the rules of the game were not broken (FIG. 14). The data requirements for this process are shown in Table 4.

each player, though the information will certainly be stored on each player's PC. The verification software needs to be trusted—so it must either be provided by an independent entity or regulatory body or certified by such an organization.

Game Verification Begins
1. The game ends and the host casino communicates a "Game is Over" Game Event to each player. The host casino begins the Game Verification process.
2. Each player's PC processes the Game Event, notifies the player, and begins the Game Verification process.

Game Seed Verification

TABLE 4

GAME VERIFICATION DATAGRAM CONTENTS

| FIELD NAME | DESCRIPTION | DATA TYPE |
|---|---|---|
| HEADER | | |
| Player ID | A unique identifier for the player | Integer |
| Other Player ID Set | A list of unique identifiers for all players in the game | Set of integers |
| House ID | A unique identifier for the house | Integer |
| Game Name | A unique identifier for the type of game being played | Enumerated list of allowable games recognized by the house |
| Game ID | A unique identifier for the specific game being played | Integer |
| GAME PROTOCOL VERIFICATION PAYLOAD | | |
| Game Protocol Verification Content | The information needed to reconstruct the game specified by the Game ID. It consists of a series of data structures for each event that needs information communicated between players and the house for the verification process. | A set of data structures with each element including Game Sequence Numbers, Verification Activity Type, and activity information content |
| Game Activity Sequence Number | A unique number for the event or decision within a specific game. Established only by the house. It is used in this verification protocol for recalling old events from the setup or play portions of the game. | Integer |
| Verification Activity Type | A value identifying whether this is verification of game seeds or secrets (decisions or events) | Enumerated list (game seed verification or secret verification) |
| Game Protocol Verification Exception Information | Notification to all players as well as the house of any exceptions to the proper execution of the game protocol | Data structure[1] |
| *The following information is used for cooperative seed activity verification:* | | |
| Player Random Seed | A random number provided by a player for use in cooperative random generation. This was stored when it was generated by player and is used in the reconstruction of the game seed during the seed verification process. | Binary Sequence defined only for player communications with house |
| Player Random Seed Set | A set of pairwise data (player ID, random seed) that identifies the random numbers provided by a set of players having Player ID(s) for use in cooperative random generation. This is used in the verification phase to reconstruct game seeds. | Set of ordered pairs of integers and Binary Sequence |
| House Random Seed | A random number generated by the host casino for use in cooperative random generation. It is not provided to the player(s) until the verification phase in the reconstruction of the game seed. | Binary Sequence |
| House Random Seed Irreversible Transform | The irreversible transform of the random seed used by the house for cooperative random generation. The players use this during the verification phase to verify that the House Random Seed is correct and unchanged since the time of seed creation. | Binary Sequence |
| *The following information is needed to reconstruct other secret activities:* | | |
| Play Activity Content | The contents of the event, decision, or reveal activity | Data structure |
| Play Activity Content Irreversible Transform | The irreversible transform of the content of the event, decision, reveal, or bet activity | Data structure |

[1] Data structure unique to the player decision, to include all supporting parameters - see narrative for content examples.

As noted throughout the Game Setup and Game Play sections, data has been stored in Logs to support verification. This data about House Events and Player Decisions is retrieved from the appropriate Game Log and used to reconstruct the entire sequence of events and decisions that together constitute a game. Some of this information may only be revealed during the Verification phase (depending on the specific game and game rules). This information is combined with the information accumulated during the course of the game in the Game Logs to allow every step of the game to be reconstructed and verified against the Game Setup and Play processes and Game Rules. The details of the Game Verification process may not be displayed in their entirety to 3. The host casino retrieves the House Game Seed from the House Game Log.
4. The host casino communicates the House Game Seed to each player. The host casino optionally retrieves all of the Player Game Seeds from the House Game Log as well and sends them to each player's PC (these seeds were sent out during the Game Setup process).
5. The host casino retrieves the Game Seed from the House Game Log.
6. The host casino communicates the Game Seed to each player's PC. If there were multiple Game Seeds and House Random Seeds used during the course of the game, they are all retrieved and sent at this time.

7. Each player's PC computes the irreversible transform of the newly received House Random Seed and compares it with the House Random Seed Irreversible Transform retrieved from her Player Game Log (this was provided during the Game Setup process).
8. If the comparison fails, the player communicates that fact to the host casino and takes appropriate action (including contacting regulatory bodies) depending on the formal contract between the player and the casino. The player's PC and the host casino will also file the information in the appropriate Exception Log.
9. If the comparison succeeds, the player's PC uses the Cooperative Random/Seed Generation process, the newly received House Random Seed, and all of the players Player Random Seeds (either just received or retrieved from their respective Player Game Logs) to construct the Game Seed. This process is repeated for each Game Seed used during the course of the game. Note that the Cooperative Random/Seed Generation process is known to all of the players and the host casino prior to the beginning of the game. Rebuilding the Game Seed is equivalent to allowing the shuffle of a deck of cards or sequence of dice rolls to be recreated after the game is over—allowing all of the activities from a game of blackjack or poker to be rebuilt.
10. Each player's PC compares the newly constructed Game Seed with the Game Seed received from the host casino. The player's PC can also compare the irreversible transform of the Game Seed with the Game Seed Irreversible Transform retrieved from the player's Player Game Log. Note that there is no need to provide a Game Seed Irreversible Transform as the Game Seed is verified by the seed reconstruction process. This would only be done for performance reasons.
11. If either comparison fails, the player uses her PC to communicate that fact to the host casino and takes appropriate action (including contacting regulatory bodies) depending on the formal contract between the player and the casino. The player's PC and the host casino will also file the information in the appropriate Exception Log.

Reveal All Secrets
12. If there are unrevealed secret decisions that are held by any players, each player's PC will retrieve these decisions from her respective Player Game Logs and communicate them to the host casino. This includes both the Play Activity Content and Game Activity Sequence Number. In the game "Battleship", a player would provide the locations of all of her ships to the other player (though only the "unsunk" ones would really need to be sent).
13. The host casino retrieves all of the remaining unrevealed secret decisions from the House Game Log. This includes both the Play Activity Content and Game Activity Sequence Number.
14. The host casino computes the irreversible transform of the Game Activity Content for newly received secret decisions and compares them with the corresponding Game Activity Content Irreversible Transform that the host casino retrieved from the House Game Log. The host casino also stores the newly received Game Activity Contents in the House Game Log.
15. If the comparison fails, the host casino notifies the player and takes appropriate action based on the formal agreement between the casino and the player. This could include forfeiting any funds that were bet, a financial penalty, banning the player from the casino, etc. The host casino also notifies any other players and takes appropriate action based on the formal agreement between the casino and the players. This could include refunding money or some penalty paid by the offending player.
16. If the comparison succeeds, the host casino verifies that the decisions were legal under the Game Rules and Game State at that point in the game. If the decisions were illegal, the host casino notifies the player and takes appropriate action based on the formal agreement between the casino and the player. The host casino also notifies any other players and takes appropriate action based on the formal agreement between the casino and the players.
17. The host casino communicates all of the remaining unrevealed secret decisions to all of the players. The host casino also forwards any newly received secret decisions to all of the players.
18. Each player's PC computes the irreversible transform of the Game Activity Content for newly received secret decisions and compares them with the corresponding Game Activity Content Irreversible Transform that the player retrieves from their respective Player Game Log.
19. If the comparison fails, the player communicates that fact to the host casino and takes appropriate action (including contacting regulatory bodies) depending on the formal contract between the player and the casino. The player's PC and the host casino will also file the information in their respective Exception Logs.
20. If the comparison succeeds, the players each store the received player decisions in their respective Player Game Logs. Note that now each player possesses all of the player decisions from the game.

Random Event Reconstruction
21. Each player will use her respective Player Game Log and the Game Seed (or Game Seeds, if there were several) to reconstruct all Random Game Events. The Game Seed allows the shuffle or die rolls to be rebuilt, the deterministic random generation or cooperative random generation process actually rebuilds the specific random event (card or dice roll) sequence.
22. The player will use her PC and the Game Seed to compute all of the random Game Events and compare them with the random Game Events that the player's PC had stored in her Player Game Log. Each player's PC will store the newly computed random Game Events in her respective Player Game Log. Note: prior to the game, the host casino and all the players know the deterministic random process that was used.
23. If the comparison fails, the player communicates that fact to the host casino and takes appropriate action (including contacting regulatory bodies) depending on the formal contract between the player and the casino. The player's PC and the host casino will also file the information in the Player Exception Log. Note: each player now possesses all of the Game events (both random and deterministic) from the game.

Rules Verification
24. Each player's PC will retrieve the Initial Game State from her respective Player Game Log and use combination of all of the player decisions and game events that she now possesses on her computer to verify that each player decision and each game event is consistent with the Game Rules. This verification can only be done at this time for activities that were not known to a player: secret moves or piece placement as well as card draws (as in poker).
25. If the rule verification fails, the player communicates that fact to the host casino and takes appropriate action (including contacting regulatory bodies) depending on the formal contract between the player and the casino. The player's PC and the host casino will also file the information in the Player Exception Log.

26. If the rule verification succeeds, the Game Verification Process was a success and each player communicates that fact to the host casino. The host casino stores each player's confirmation in the House Game Log. The host casino will also communicate this fact to each of the other players. Each player will log the other players' confirmed verification in her respective Player Game Log. Each player then may begin another game.

Game Verification Exception Processing

27. The host casino or players' Pcs will notify the other participants in the game of any failures that occur during the Game Verification process. These failures will be logged in the appropriate Game Logs as well as the Exception Logs. Failures will result in processing either to restart the Game Verification process or restore the Game Verification process to some known state. Players will always have the option to verify a game for as long as the casino is required to store the game log based upon regulatory requirements as well as the formal contract between the player and the host casino. This processing will be determined by the game rules and the formal contract that the player agreed to when she registered with the host casino.

It is likely that the house will also take some action independent of the Game Verification process to address player cheating. Similarly, if a player has detected cheating by the house or another player, some action to a regulatory body or law enforcement entity is likely.

2.5 Host-Player Transactions

Host-Player Transactions provide a means of reliably processing individual game process steps and ensuring that player(s) and the casino have consistent information about the state of the game (FIG. 15). The Host-Player Transactions process is used for most of the steps in the processes where there is a communication of information between a player and the host casino (see FIG. 10). These steps are clearly noted in the descriptions of Section 2.1 through 2.4 and in the figures corresponding to those sections. The data requirements for this process are shown in Table 5.

TABLE 5

HOST-PLAYER TRANSACTION DATAGRAM CONTENTS

| FIELD NAME | DESCRIPTION | DATA TYPE |
|---|---|---|
| HEADER | | |
| Player ID | A unique identifier for the player | Integer |
| House ID | A unique identifier for the house | Integer |
| Transaction Type | The ID of the receiver, whether player or house | Integer |
| Transaction Data | Identifies whether this is the communication, acknowledgement, or confirmation of acknowledged game information. These types are implemented in this order as part of the transaction three-step handshake. | Enumerated list. One of the set: (communication, acknowledge, confirm) |
| TRANSACTION DATA | | |
| Date/Time | Specification of the date and time of the game being played. This date/time is associated with the time of the transaction step. | Data structure |
| Transaction ID | A unique identifier for the specific transaction | Integer |
| Transaction Sequence Number | A unique number for the event or decision within a specific transaction. Established only by the house. Not defined until the transaction is acknowledged. | Integer |
| TRANSACTION PAYLOAD | | |
| Embedded Process Datagram | The transaction payload, which will include the encapsulated Game protocol (Sections 2.1-2.4) | Data structure (see Sections 2.1-2.4) |
| Transaction Response Information | A code used for notifying the receiver of the transaction step of the progress in the proper execution of the protocol. This can be either acknowledgement or exception information. | Data structure[1] |
| AUTHENTICATION DATA | | |
| Signature and Integrity Data | Public key signature and other integrity information | Binary sequence[2] |

[1] Data structure unique to the transaction protocol and any other standards or commercial technologies supported in the implementation for authentication or non-repudiation.
[2] May be a custom format, or be implemented as defined in the Internet Task Force (IETF) X.509 digital signature standard.

This process uses a three-step handshake protocol to ensure that data is properly transferred between a player and the host. It also uses authentication via Digital Signatures (Section 3.4.3) to provide very strong data integrity and non-repudiation. This property means that the receiver of a signed message will know who sent the message. The receiver will also know that the received message is the one that the sender sent. The signature has the additional property that the sender cannot later deny that she sent the message. Since either the host casino or the player can initiate a Host-Player Transaction, this description will use the term "sender" for the party that initiates the transaction and is providing data and "receiver" for the party that is accepting the data. The Host-Player Transaction process is tailored to meet the unique distributed gaming requirements. This process supports resending data if a previous step in the process fails. If so, the transaction can either roll back to the beginning or to the previous step in the transaction. Transactions may be optionally logged and are noted in the appropriate step of the process by either the player or the host casino in their respective Transaction Activity Logs. This log may be kept for an extended period of time to meet game verification or legal/regulatory requirements or kept only for the duration of the game or even just the specific transaction. Each transaction includes a sequence number that is defined by the host casino and is incremented with each game activity. Date and time information needs to be accurate enough that the sequence numbers will not be reused.

At the Beginning of the Session of the Casino:

The host casino defines a Transaction Sequence Number at the beginning of a session with a player prior to any Game Setup or Player Registration activities.

Transaction Creation
1. The sender's computer retrieves the process step datagram.
2. The sender's computer formats the transaction datagram including the Transaction Header and inserting the process step information into the Transaction Payload. The sender then computers the signature and formats other integrity data for the Transaction Authentication Data. The sender stores the Transaction Datagram in the Transaction Activity Log. Note—the sender does not necessarily need to store the actual datagram, but can store sufficient information to reconstruct the datagram in case the transaction fails for some reason.
3. The sender communicates the Transaction Datagram to the receiver.

Transaction Confirmation and Acknowledgement
4. The receiver verifies the signature and other authentication information with the received Transaction Header and Payload.
5. If the verification fails, the receiver formats a Transaction Response Information datagram describing the failure in the Transaction Payload.
6. If the verification passes, the receiver formats a Transaction Response Information datagram. This can be as simple as a flag or the entire Transaction Payload that the receiver received.
7. The receiver stores the Transaction Response Information datagram information in its Transaction Activity Log.
8. The receiver communicates a Transaction Datagram to the sender including the Transaction Response Information.

Transaction Acknowledgement Confirmation
9. The sender verifies the received Transaction Datagram. This is dependent on the type of Transaction Response Information that is used.
10. If the sender's verification fails, the sender formats a Transaction Response Information datagram that prompts the receiver to resend the receiver's response. This can also occur if the sender does not receive a response within a certain period of time.
11. If the sender verification passes but the receiver's initial verification failed, the sender reformats the original Transaction Datagram. Note that date/time information may change, but the Transaction Sequence Number would not need to.
12. If the sender's verification and receiver's verification both pass, the sender formats a response that she received the receiver's initial response. The sender stores the fact that the transaction has successfully concluded in the Transaction Activity Log.
13. The sender stores the Transaction Response Information datagram information in its Transaction Activity Log.
14. The sender communicates a Transaction Datagram to the receiver including the Transaction Response Information.

Transaction Confirmation and Closure
15. The receiver verifies the received Transaction Datagram. This is dependent on the type of Transaction Response Information that is used.
16. If the receiver's second verification fails, the receiver communicates a request to the sender to resend the Transaction Datagram. This can also occur if the receiver does not receive a response within a certain period of time.
17. If the receiver's second verification passes and the sender's verification had failed, the receiver reformats the original Transaction Datagram and resends it to the sender. Note: the date/time information may change, but the Transaction Sequence Number would not need to.
18. If the receiver's second verification and the sender's verification both pass, the Transaction has successfully concluded and this fact is stored in the Transaction Activity Log.

Transaction Sequence Number Distribution
19. During the first transaction step that the host casino participates in, it includes the next Transaction Sequence Number for the player.

2.6 Secure Host-Player Communication

The purpose of the Secure Host Player Communication process is to set up a secure channel between each player and the house (FIG. 16). The data requirements for this process are shown in Table 6.

TABLE 6

SECURE HOST-PLAYER COMMUNICATION DATAGRAM CONTENTS

| FIELD NAME | DESCRIPTION | DATA TYPE |
|---|---|---|
| HEADER DATA | | |
| Player ID | A unique identifier for the player | Integer |
| House ID | A unique identifier for the house | Integer |
| Communication Type | Identifies whether this is a game transaction or other communication | Enumerated list |
| Destination ID(s) | The unique identifiers of other destinations for the information | Integer set |
| COMMUNICATION PAYLOAD | | |
| Message Content | The communication datagram associated with the communication protocol of choice, which will include the encapsulated Transaction protocol (Section 2.5) | Data structure |
| Communication Exception Information | An error code used for notifying other party(ies) of any exceptions to the proper execution of the protocol. The destination ID(s) are used as recipient addresses. | Data structure |

This process rides on top of some ordinary network communications protocol (such as TCP/IP) and can be used both to carry the Host-Player Transactions and other message communications (FIG. 17). The Secure Host-Player Transactions process is used for most of the process steps where there is a communication of information between a player and the host casino (see FIG. 10). These steps are clearly noted in the descriptions of Section 2.1 through 2.5 and in the figures corresponding to those sections. All communications between different players are forwarded through the host casino. The host casino determines if the communication is legal to forward based on the Game Rules and formal contract and logs the communication for use in Game Verification if necessary.

At the Beginning of the Session at the Casino:
1. The player's PC and the host casino use some mechanism to create a unique key to secure their communications.
2. The player's PC and the host casino use the unique key to encrypt the link between the two.
3. The player communicates identifying information to the host casino that was developed during the Player Registration process within the secure communication link.

4. If the player identification information is invalid, the host casino ends the session and logs the information in an Exception Log.
5. The host casino provides corresponding identifying information to the player. This information was also provided during the Player Registration process.
6. If the host casino identification information is invalid, the player ends the session and logs the information in an Exception Log.
7. If the identification information is valid, the secure host-player communications link is established and used for all subsequent communications during a session.

For each communication step between a player and the host casino:
1. For each message type, the sending party formats the Message Content and Message Header into a Communication Datagram. Message types can include Transaction Datagrams, player/house communications, and messages to be forwarded to other players. Note that the protocol does support date/time information. The house will act as master for the clock and provide this information to the player(s) with the other protocol information.
2. The sending party encrypts the message.
3. The sending party sends the message to the receiving party.
4. The receiving party receives the message.
5. The receiving party decrypts the message.
6. The receiving party processes the message.
7. The host casino or player's PC will notify the other participant in the session of any failures that occur during the Secure Host-Player Communication process. These failures will be logged in the Exception Logs.

3. Theory of Operation

Four technical design features of the Distributed Gaming Transaction Processing System with Provable Honesty provide the support for honest gaming transaction processing systems:
1. A Game Transaction Process System Architecture provides a construct in which a wide range of games transaction systems can be described.
2. The Trusted Referee model provides the method for assuring the honesty of a game transaction process.
3. Honesty Model explains the capabilities and limitations of the system for controlling cheating.
4. Mathematical Technical Elements are used in the implementation of the protocol and are built on well-known mathematical and cryptographic techniques.

3.1 Game Transaction Processing System Architecture

The Distributed Gaming Transaction Processing System with Provable Honesty works because game transaction processing systems are a structured sequence of interactions that are controlled by a set of rules. Generic transaction processing systems can be thought of as games: they include one or more parties (players) that interact in a structured way (rules) to reach some conclusion (determine a winner). The remainder of this section will describe transaction processing systems in terms of games. There are five main elements to a game, that are described below and illustrated in FIG. 18.
1. Events—activities that occur during the course of the game that affect the game outcome. Events are determined by the rules of the game, as opposed to decisions of the players.
2. Decisions—Choices by players during the course of the game that affect its outcome.
3. Rules—The list of legitimate interactions and combinations of game events and player decisions that enable a game to progress from one state to a subsequent state. Rules are used to define the beginning and end of a game. Rules are used to define the winner of the game. Any available software (e.g. "Deluxe Casino Pak 16" by Masque Publishing) may be adopted to serve as the rules.
4. Environment—The visual, auditory, and other attributes that make the game entertaining to play as well as facilitating the understanding of the rules and the current state of the game (looking at the board in a game of Monopoly). The game environment may be different for different individual players, as they may not have access to the complete game state.
5. State—The game state consists of the status information as well as current possible game events and player(s) decisions. It is the accumulated result of all past events and decisions made during the course of the game from a known starting point. A change in game state occurs with each event or decision. Individual players do not necessarily know the complete game state.

This framework allows most game transaction processes to be described in a systematic format that will allow automation of rules enforcement and use of the Network Gaming Transaction Processing Protocol to permit play processing of the game transaction system in a distributed or network environment.

3.2 Trusted Referee Model

A trustable game transaction processing system is one where players can have confidence that the rules are known and enforced. There are two aspects to this trust—trusting other participants and trusting the referee himself.

The referee monitors all activities of participants (decisions and inter-participant communication) making sure that all actions conform to the rules of the game transaction processing system by having a complete understanding of the rules of the game transaction processing system and the current transaction processing system state. The referee is therefore able to know what participant decisions and transaction processing system events are possible at any given point in a transaction processing system. The referee will not let any illegal actions occur: if a rule violation is attempted, the referee will immediately intervene and take the appropriate actions (also determined by the rules). These actions may range from directing the participant to make another choice all the way to ending the transaction process game and invoking some penalty against the participant.

"Trusting the referee" is the implementation challenge that is solved by the verification portion of the Network Gaming Transaction Processing Protocol. The participant is provided with an independent copy of the referee—an application that has a complete understanding of the rules of the game transaction processing system—that can retroactively (or in some cases immediately) verify that the transaction processing system referee controlled by the host is acting appropriately and that the game itself is well-balanced. This application can be provided by an independent regulatory body or certified by such an organization. The participant-controlled referee application can then be used to support any claims of rules violation against the host or other participants in conjunction with the participant transaction processing system log that the participant uses to verify the transaction processing system.

In transaction processing systems without a host, two or more participants could each use their referee applications to validate the honesty of the other.

3.3 Honesty Model

There are two types of honesty within a transaction system: transaction honesty and human honesty. Transaction honesty is the honesty of the steps within the transaction and the transaction processing rules—everything that is within the system. This disclosure has explained at length about the protection of the steps of a transaction. Transaction processing rules are the common agreements between the parties to a transaction. In a distributed system, it is especially difficult to know that the parties are using the same rules. Some means of rule set registration is needed so that there is a common way of labeling rule sets ("blackjack—Las Vegas style with an 8 deck shoe that burns the shoe after between 100 and 300 draft cards". There also needs to be a means to communicate and authenticate these rule set labels.

Human honesty is the behavior of the individuals involved in the transaction outside of the transaction system, itself. Unfortunately, there is no way to automate, authenticate, or otherwise enforce honest behavior by individuals outside of the transaction system. Individuals can collude or engage in other activities that may not be allowed for a given transaction. The main vehicle in a transaction system, particularly a distributed system, to encourage appropriate behavior by individuals are contracts and monitoring. The contract must specify the sanctions for breaking the rules of the transaction system. Monitoring is observing the transaction behavior of individuals for anomolous behavior. Additionally, for a distributed system, power outages, dropped connections, and other problems need to be addressed. A particular problem that needs to be addressed is a party to a transaction attempting to abort the transaction in order to avoid an adverse result (such as a player about to lose a game).

3.4 Technical Elements

There are four main technical elements that are used for the Network Gaming Transaction Processing Protocol. Randomizers, Irreversible Transforms, and Signatures and Hash Functions are well known mathematical techniques. Cooperative Seed Generation is a new combination of Randomizers and Irreversible Transforms to cooperatively generate random numbers.

3.4.1 Randomizers

This invention uses randomizers for two purposes. First, randomizers are used to generate the seeds that the house and players use (Sections 2.2-2.3). These randomizers can be either deterministic or truly random. Second, deterministic randomizers can be used with the game seed to sequentially generate the random events in a game. A deterministic randomizer must be used to generate random events in order to allow the sequence to be reconstructed after the game.

Randomizers generate information that cannot be predicted. For computer-based randomizers, this typically means that zeros and ones are generated such that the knowledge of the sequence that has been generated will give no predictive knowledge of what will be generated next. There are two types of randomizers—true randomizers and deterministic randomizers (or pseudo-randomizers). True randomizers are built on some natural noise source to generate their random data. Deterministic randomizers use a mathematical function and a seed value to generate pseudo-random data. The output of the mathematical function on the seed is the pseudo-random data (a series of 0's and 1's). The seed is then usually updated in some manner to continue to generate random data. A good deterministic randomizer is one that, given knowledge of the randomizer function and a sequence of generated data but not the seed, it is computationally infeasible to guess the pseudo-random data that will be generated next. For this reason, the Game Seed is not divulged until game play has ended.

A binary random stream can be used to generate any desired distribution. A uniform distribution of the values from 0 to N−1 can be generated from a $\log_2 N$-bit sequence from the random stream and generating a new value if the result is out of range (greater or equal to N). For example, values from a deck of 52 cards can be found by using a 6-bit sequence from the random number generator. This 6-bit number will be a number between 0 and 63. If the value generated is not between 1 and 52, then a new 6-bit sequence will be drawn until a value in the 1 to 52 range is generated. If multiple cards need to be dealt, then the next number is drawn out of the range 1 to 51, then 1 to 50, etc. Non-uniform distributions can be built by combining uniform distributions.

3.4.2 Irreversible Transforms

An irreversible transform is a mathematical function with the attribute that given the output of the function it is computationally unfeasible to reconstruct the input (a simple example would be that of an ordinary paper phone book—it is easy to find a phone number for a given name, but it is very hard to find the name if all that is possessed is the phone number and a copy of the phonebook). All irreversible transforms "coalesce" the input data—the number of possible outputs is less than the number of possible inputs. For this invention, interesting irreversible transforms have nearly as many possible output values as input values. The irreversible transform needs to have a large input and output field (e.g., 512 or even 1024 bits). This allows the data required for the protocol to fit within a single field. Thus, a random seed for use in a game may require 256 bits and the input to the irreversible transform would append additional random bits to the input:

Input to Irreversible Transform=(Data Stream, Random Data Stream to "fill out" Input Field)

In the example above, with 1024 bit irreversible transform and a seed of 256 bits, the "filled out" random data stream would be 768 bits in length. An example of an irreversible transform is a function of the form:

Sample Irreversible Transform$(x)=E(x)+x$

Where $E(x)$ is an good encryption function with a known key and x is an input field with the desired length.

Irreversible transforms are used both to generate keys (see below) and protect and allow validation of secrets in the Network Gaming Transaction Processing Protocol. The secrets protection process starts with the binary representation of the thing being protected:

Secret

The irreversible transform of the secret is created and provided to the other party with whom the secret is supposed to be shared at a later point:

IrreversibleTransform(Secret)

When the time comes for the secret to be revealed, an "alleged" secret is provided by the person who made the secret decision to the party that wishes to verify the secret:

AllegedSecret

The verifier then computes the irreversible transform of the alleged secret and compares it with the previously received irreversible transform of the secret:

Compare

IrreversibleTransform(AllegedSecret)

with

IrreversibleTransform(Secret)—previously received

If they agree, then the secret has been revealed and the honesty of the secret decision confirmed. If not, appropriate other measures can be taken. Because of the properties of irreversible transforms, no other secret could have created the received secret and the receiver cannot reconstruct the actual secret until it is revealed.

3.4.3 Signatures and Hash Functions

Signatures are used to ensure that only a single individual could have created the message that was signed. Signatures are a combination of two elements: a hashing function and a public key encryption function.

A hashing function takes any arbitrary variable length stream of data and reduces it to a relatively small fixed sized data block (say 1024-bits) usually called the hash value. The hashing function has the attribute that given the knowledge of the hashing function and a data stream it is computationally infeasible to generate another data stream with the same hash value. This condition is often weakened in practice that no controllable input data stream can be created with the same hash value. The hash value must be large enough that it is computationally infeasible to create a "dictionary" of hash values. Thus, an 8-bit hash value would be far too small since there are only 256 possible hash values ($2^8$) as opposed to $2^{1024}$ possible values in the example.

A public key encryption function is used to ensure that only the originator could have created and signed the message. Public key cryptography relies on mathematical functions that are asymmetric. In these functions, knowledge of the public (decrypt) key and the mathematical function will not allow reconstruction of the encrypt key (which is kept as a secret known only by its creator). The commercial Rivest-Shamir-Adelman (RSA) process is the best known example of this technique. This secret encryption key is used to encrypt the hash value for a message—thereby "signing" it:

Signature(Message)=Encrypt$_{SecretKey}$(Hash(Message))

The originator then sends the pair:

Message, Signature(Message)

The verification of this process uses the public decrypt key and the publicly known hash function:

Compare

Decrypt$_{PublicKey}$Signature(ReceivedMessage)

with

Hash(ReceivedMessage).

If the comparison agrees, then only the suspected originator could have created the signed message. There are variations on this process that can also be used, including signatures without public key, so long as the functionality is retained.

3.4.4 Cooperative Seed/Random Generation

The cooperative seed or cooperative random generation process allows the creation of a random number that cannot be predicted or controlled by any of the parties to the process. This process can be used for the creation of seeds to generate random numbers or to create random numbers directly. This description of the process will have multiple parties with one being called the House and the others called Player(1) through Player(N) where N is an integer greater than 0. The process uses irreversible transforms, described above.

First, the House creates a random number:

Random(House)

Next, the House computes an irreversible transform of the random number and provides it to players:

IrreversibleTransform(Random(House))

Each player also computes a random number:

Random(Player(1)), Random(Player(2)),

Random(Player(3)), . . . Random(Player(N))

The players then provide irreversible transforms of their respective random numbers to house and to each other:

IrreversibleTransform(Random(Player(1))),

IrreversibleTransform(Random(Player(2))),

IrreversibleTransform(Random(Player(3))), . . .

IrreversibleTransform(Random(Player(N)))

Once all parties receive these irreversible transforms, the players then provide their random numbers to the house and each other:

Random(Player(1)), Random(Player(2)), Random(Player(3)), . . . Random(Player(N))

The house then combines the player random numbers with its own random number to create the cooperative random number. This function could be as simple as an "exclusive or":

CooperativeRandomNumber=Function (Random(House), Random(Player(1)), Random(Player(2)), Random(Player(3)), . . . Random(Player(N)))

In the Distributed Gaming System with Provable Honesty, this cooperative random number can be revealed immediately or during the verification phase. Until the number is revealed, the number must be protected by the host casino to protect the game. To verify that the house did not control the construction of the random number, the previously stored:

IrreversibleTransform(Random(House))

can be compared with the irreversible transform of the received alleged random number during game verification:

Irreversible Transform (AllegedRandom(House))

By eliminating the House, a random number can be created to be used immediately. This could be used in cases where there is no need for secret random information. Thus, most card games need a house while games like Craps do not.

4. Conclusions, Ramifications, and Scope of Invention

The process described in this paper can have a unique role in enabling Internet gambling by creating an environment were individuals can play games with confidence that the house is not cheating them by stacking the deck or shaving dice.

While the above description contains many specifics, these should not be construed as limitations on the scope of the invention, but as an exemplification of one preferred embodiment thereof. Many other variations are possible. For example, using this for live gambling to increase security and ordinary game play, are all possible uses of the basic protocol and ideas described herein. Other architectures could also be considered—where Pcs are replaced by X-terminals; Web TV; in-hotel, home, or in-airplane terminals, or even client platforms that are simply a memory card to hold the essential logging information within a casino itself as a player goes from slot machine to slot machine or table to table. These "thin client" options would require an additional processor between the player and the casino that picks up most of the client functionality described in detail (Section 2) and interfaces with the thin client. The intermediate system would therefore act as an agent between the player and the casino though it would not necessarily need to be trusted.

Moreover, the apparatus and processes described herein may be applied to non-gambling transactions conducted over a communications network. For example, the technology described above may be applied in fields such as stock, currency, and commodities trading. In these fields, there is a need for simultaneous, secret, or both, submission of offers to buy or sell. The secret or simultaneous player decision capability can be used to serve this function. Game rules now, instead, become buy/sell agreements for the specific market type. This invention could allow distributed markets such as NASDAQ to have the same sort of open auction that is held in the NY Stock Exchange—a market mechanism that can provide better pricing efficiency. This technique may also allow buyers and sellers to negotiate without the use of a human broker and prevent certain forms of abuse by brokers (such as buying or selling in advance of client orders). These secret and simultaneous decision features may also be useful for general auctions and contract negotiations where secrecy and simultaneity are valued.

Elections and polling may be implemented using the secret decision mechanism to allow votes to be cast without revealing the votes until the election is complete—potentially reducing certain problems with exit polling keeping people from voting. Polling might also benefit from the ability to have secret polls held to minimize the bias of other members of the sample.

Other applications such as modeling and simulation, electronic commerce or any sort of transaction system may benefit from the features of this invention. In the modeling example, the game rules are replaced with the model engine—be it a heuristic rule set, neural net, fuzzy logic algorithm, inference engine, or other technique. For transaction systems, the game rules are replaced by transaction logic. Accordingly, the scope of the appended claims is not limited by the specific gaming embodiments described above, but may be determined by the appended claims and their equivalents.

We claim:

1. A business process for creating a secure game contract over a network, comprising the steps of:

generating a game contract agreement, comprising the steps of determining a game contract rule set, determining a set of game expectations for one or more game contracting parties, and determining potential game contract outcomes;

receiving initial game conditions for game contract generation from the one or more game contracting parties;

carrying out game contract activity according to the game contract rule set such that the one or more game contracting parties act in a synchronized manner according to the game contract rule set and the set of game expectations;

generating a non-refutable game contract log detailing all contract transactions, and storing the game contract log in a storage structure;

generating a theoretical game contract log detailing expected game contract transactions based on the game contract rule set, the set of game expectations, and the game initial conditions, and storing the theoretical game contract log in the storage structure; and verifying the game contract transactions as recorded in the game contract log by using processing structure to compare (i) the game contract transactions in the stored game contract log to (ii) the expected game contract transactions in the stored theoretical game contract log.

2. The business process according to claim 1, wherein after the process is completed, financial transactions occur based upon the secure contract.

3. The business process according to claim 1, where the game contract activities over the network are non-refutable.

4. The business process according to claim 3, where one or more digital signatures are used to provide non-refutable identification of the one or more contracting parties.

5. The business process according to claim 3, where the activities are non-refutable by any of the one or more contracting parties to the secure contract.

6. The business process according to claim 3, where the activities are non-refutable by a supporting party with an interest in the secure contract.

7. The business process according to claim 3, where the activities are non-refutable by a supporting party providing recourse for improper contracts.

8. The business process according to claim 1, where the contract rule set and initial conditions further comprise hidden events, which comprise random events generated by a trusted third party.

9. The business process according to claim 1, where the contract log further comprises simultaneous events, wherein said simultaneous events are held, controlled and verified by a trusted third party.

10. The business process according to claim 1, where any contracting or supporting party can provide recourse in the event of problems during creation of the secure contract.

11. The business process according to claim 1, wherein the step of carrying out game play contract activity includes the step of using an irreversible transform to transact the game play contract activity between the one or more game contracting parties.

12. The business process according to claim 1, further comprising the step of using a central registry to provide standard Public Key Infrastructure services for registering, revoking, and managing certificates.

13. The business process according to claim 1, further comprising the step of using a legal authority to adjudicate disagreements between game participants.

* * * * *